US010330831B2

(12) United States Patent
Sugiyama et al.

(10) Patent No.: US 10,330,831 B2
(45) Date of Patent: Jun. 25, 2019

(54) ANISOTROPIC OPTICAL FILM

(71) Applicant: TOMOEGAWA Co., Ltd., Tokyo (JP)

(72) Inventors: Masahide Sugiyama, Shizuoka (JP);
Hiroto Katagiri, Shizuoka (JP);
Hiroyuki Abe, Shizuoka (JP); Tsubasa Sakano, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 165 days.

(21) Appl. No.: 15/112,889

(22) PCT Filed: Jan. 16, 2015

(86) PCT No.: PCT/JP2015/051138
§ 371 (c)(1),
(2) Date: Jul. 20, 2016

(87) PCT Pub. No.: WO2015/111523
PCT Pub. Date: Jul. 30, 2015

(65) Prior Publication Data
US 2017/0003422 A1 Jan. 5, 2017

(30) Foreign Application Priority Data

Jan. 21, 2014 (JP) .................................. 2014-008815

(51) Int. Cl.
*G02B 5/02* (2006.01)
*B29D 11/00* (2006.01)
*G02F 1/1335* (2006.01)

(52) U.S. Cl.
CPC ...... *G02B 5/0257* (2013.01); *B29D 11/00788* (2013.01); *G02B 5/0236* (2013.01);
(Continued)

(58) Field of Classification Search
CPC .. G02B 5/0257; G02B 5/0236; G02B 5/0268;
G02B 5/0278; B29D 11/00788; B29K 2995/0044; G02F 1/133504
(Continued)

(56) References Cited

U.S. PATENT DOCUMENTS

2001/0004299 A1* 6/2001 Miyatake ............... G02B 5/305
359/489.04
2004/0110957 A1 6/2004 Wilken et al.
(Continued)

FOREIGN PATENT DOCUMENTS

JP  2005-514487 A  5/2005
JP  2005-265915 A  9/2005
(Continued)

*Primary Examiner* — Evan P Dzierzynski
*Assistant Examiner* — Mitchell T Oestreich
(74) *Attorney, Agent, or Firm* — Muncy, Geissler, Olds & Lowe, P.C.

(57) ABSTRACT

Provided is an anisotropic optical film, which can, while keeping excellent display characteristics (e.g., brightness and contrast) in the direction of a viewing angle, suppress decreased display characteristics in the other directions, when the anisotropic optical film is used as a diffusion film of a display panel.
In an anisotropic optical film including two or more anisotropic light diffusion layers where the linear transmittance varies depending on the incident angle of incident light, each of the anisotropic light diffusion layers is provided with a matrix region and a plurality of pillar regions that differ in refractive index from the matrix region, the film includes, as the anisotropic light diffusion layers, at least two types of anisotropic light diffusion layers (a) and (b) that differ in linear transmittance, the maximum linear transmittance of the anisotropic light diffusion (a) is 40% or more and less than 95%, and the minimum linear transmittance thereof is less than 20%, and the maximum linear transmittance of the
(Continued)

anisotropic light diffusion layer (h) is 20% or more and less than 40%, and the minimum linear transmittance thereof is less than 20%.

21 Claims, 8 Drawing Sheets

(52) U.S. Cl.
CPC ......... *G02B 5/0268* (2013.01); *G02B 5/0278* (2013.01); *B29K 2995/0044* (2013.01); *G02F 1/133504* (2013.01)

(58) Field of Classification Search
USPC .......................................................... 359/599
See application file for complete search history.

(56) References Cited

U.S. PATENT DOCUMENTS

| | | | |
|---|---|---|---|
| 2005/0101698 A1 | 5/2005 | Harada et al. | |
| 2015/0346396 A1* | 12/2015 | Sugiyama | G02B 5/0257 359/599 |

FOREIGN PATENT DOCUMENTS

| | | | |
|---|---|---|---|
| JP | 2005-292219 A | | 10/2005 |
| JP | 2012-181377 A | | 9/2012 |
| JP | 2012181377 A | * | 9/2012 |
| JP | 2013-167814 A | | 8/2013 |
| JP | 2013-195672 A | | 9/2013 |
| WO | 02/097483 A1 | | 5/2002 |
| WO | 2008/053592 A1 | | 5/2008 |

\* cited by examiner

[FIG. 1]
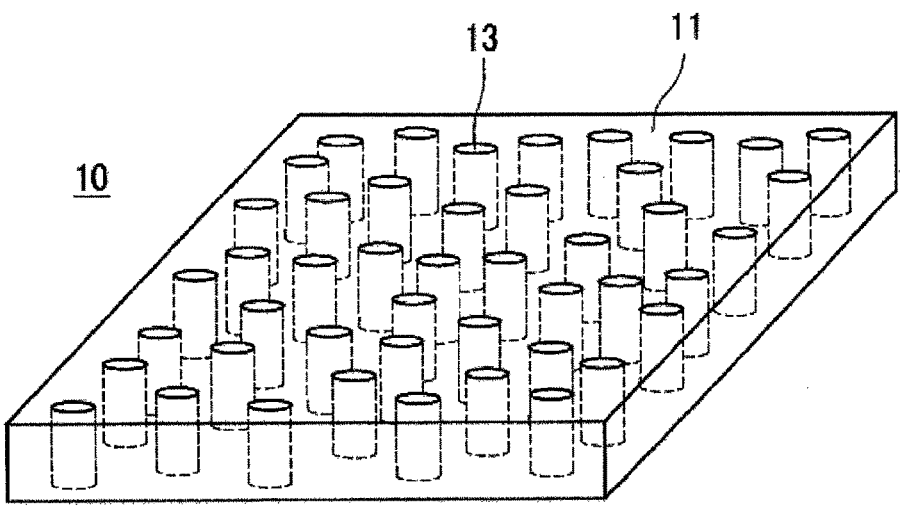
[FIG. 2]
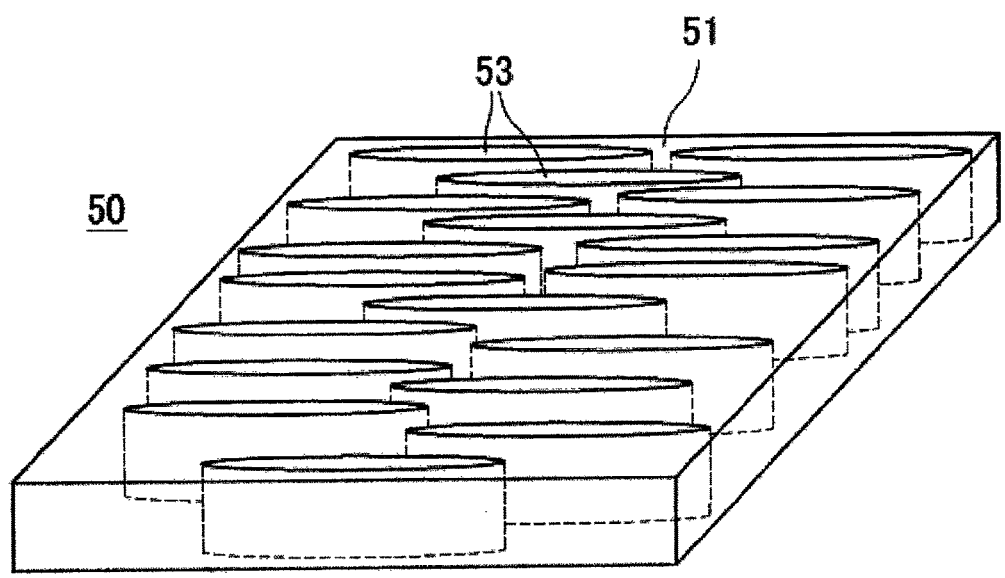

[FIG. 3]
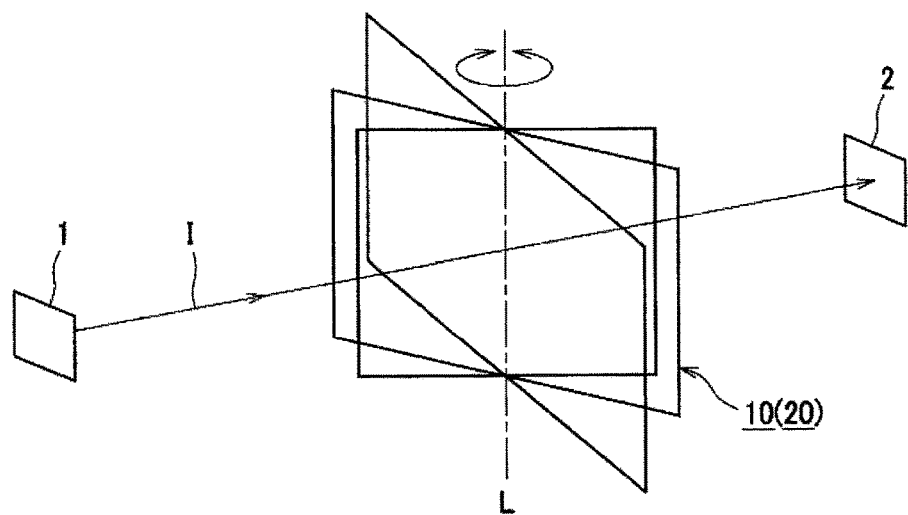
[FIG. 4]
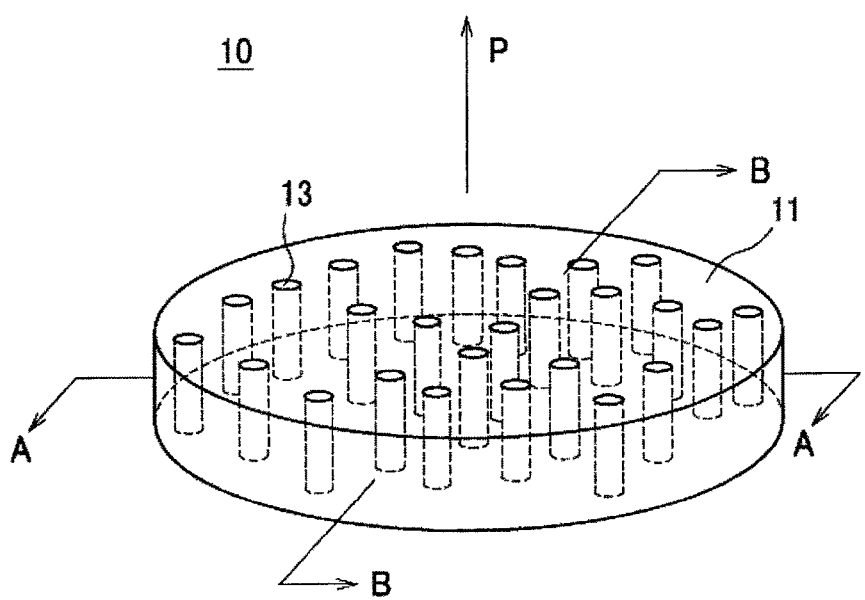

[FIG. 5]
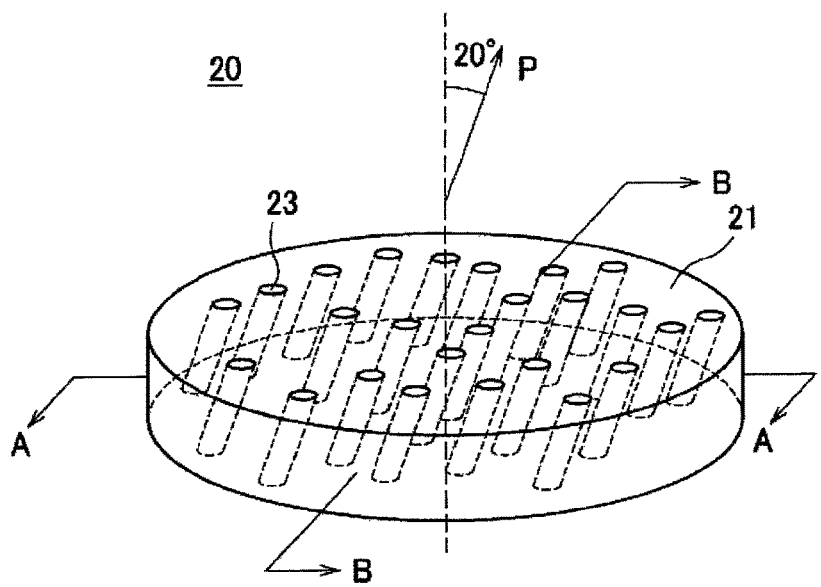
[FIG. 6]
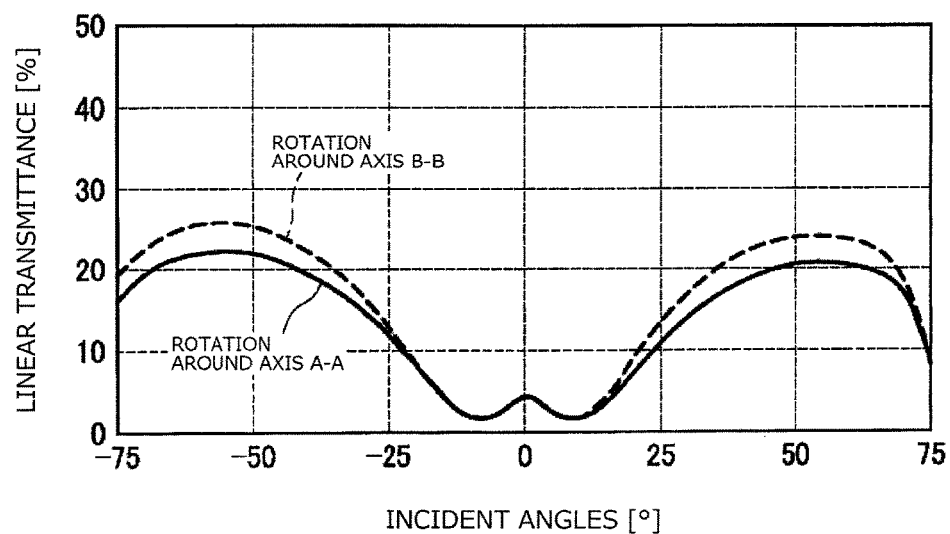

[FIG. 7]
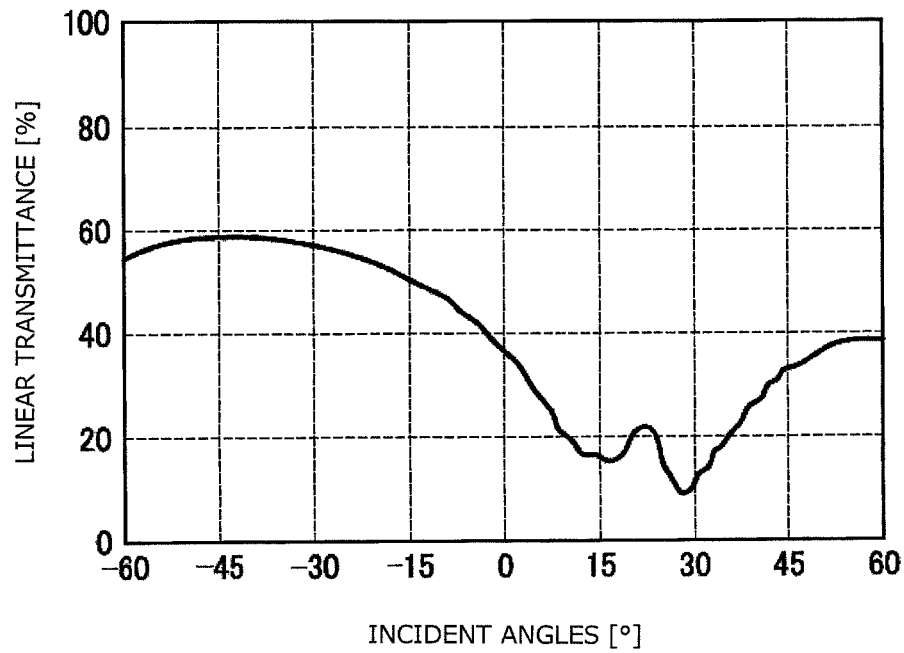
[FIG. 8]
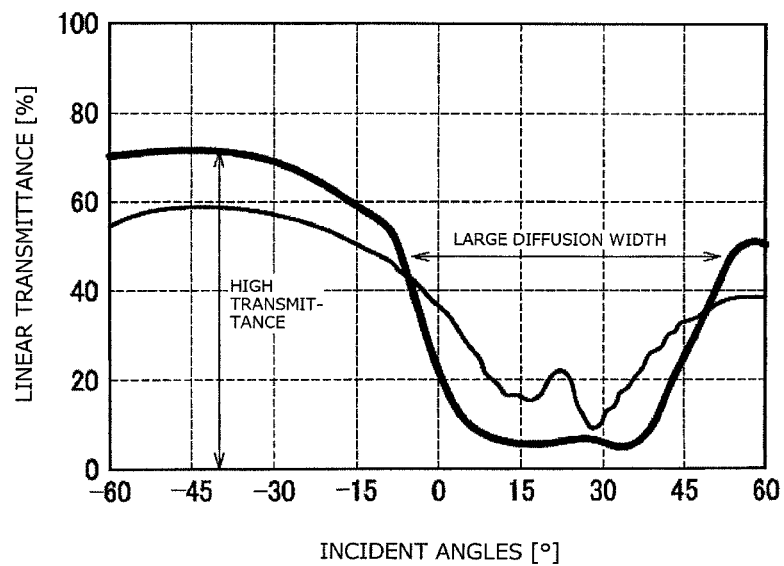

[FIG. 9]
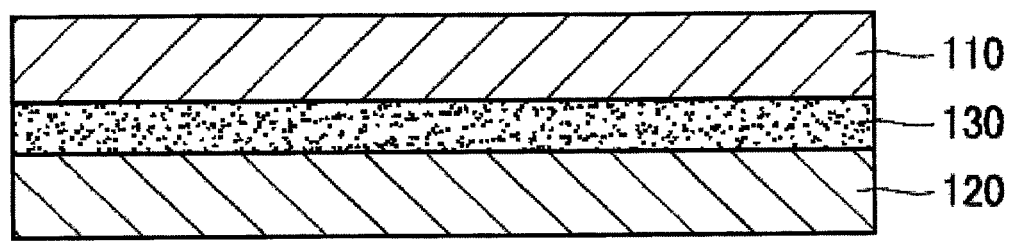

[FIG. 10A]
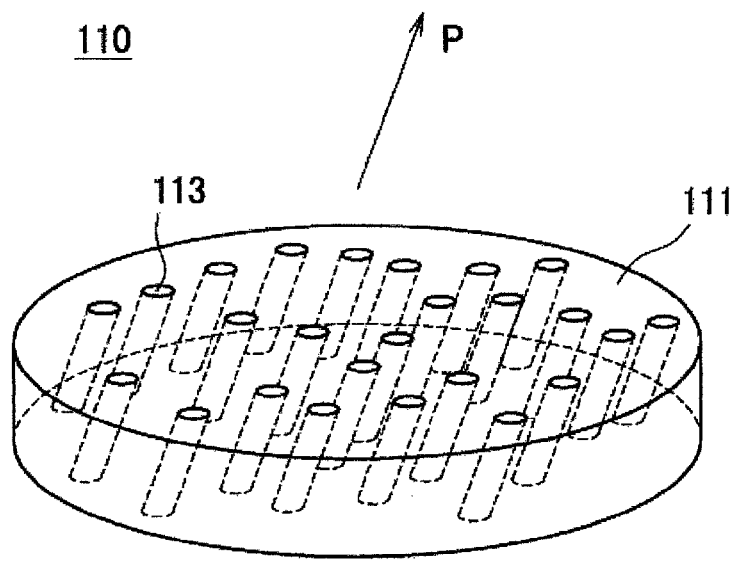
[FIG. 10B]
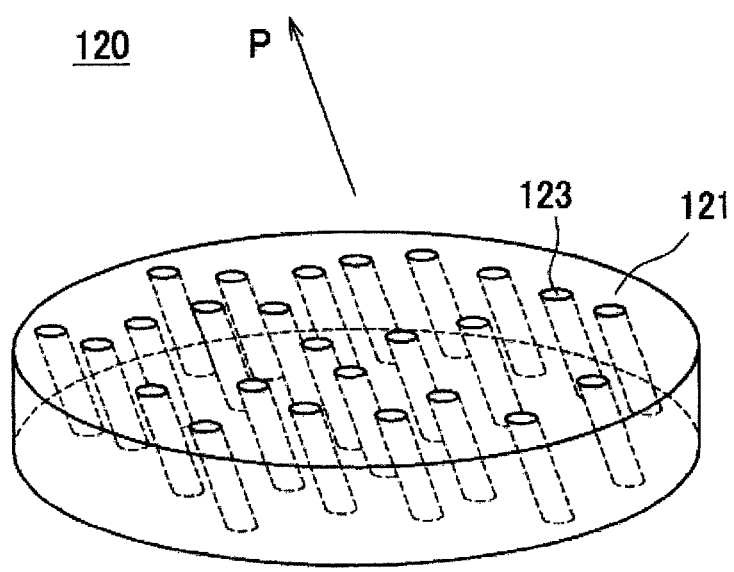

[FIG. 11]
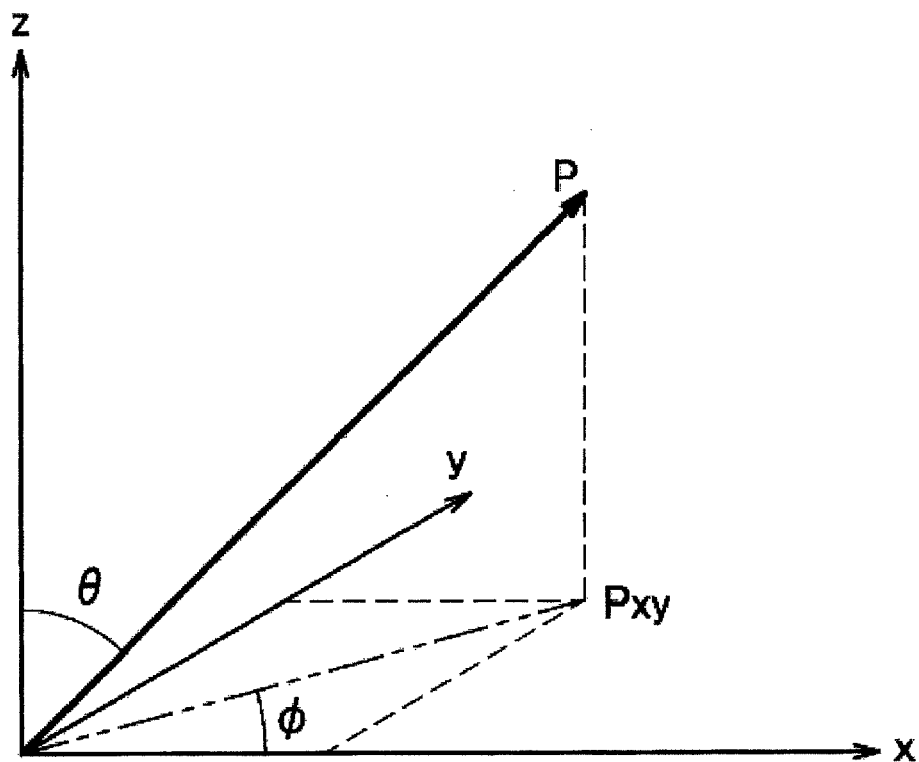
[FIG. 12]
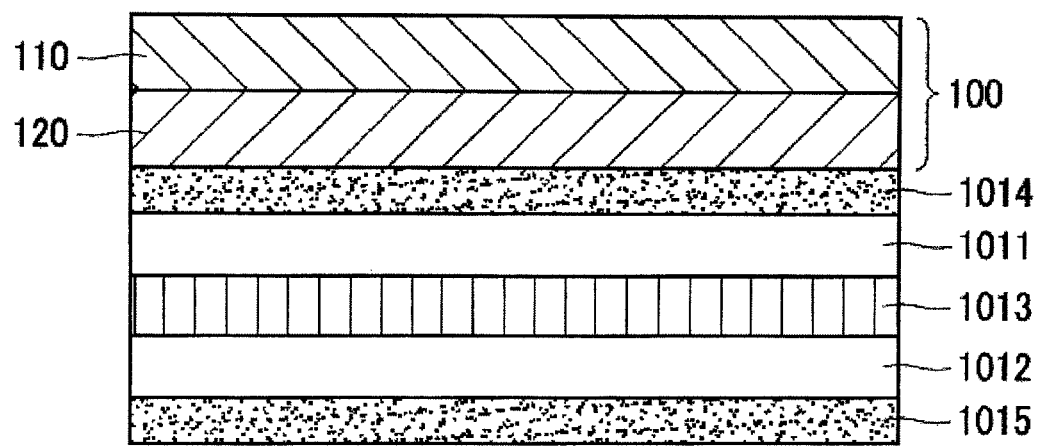

[FIG. 13]
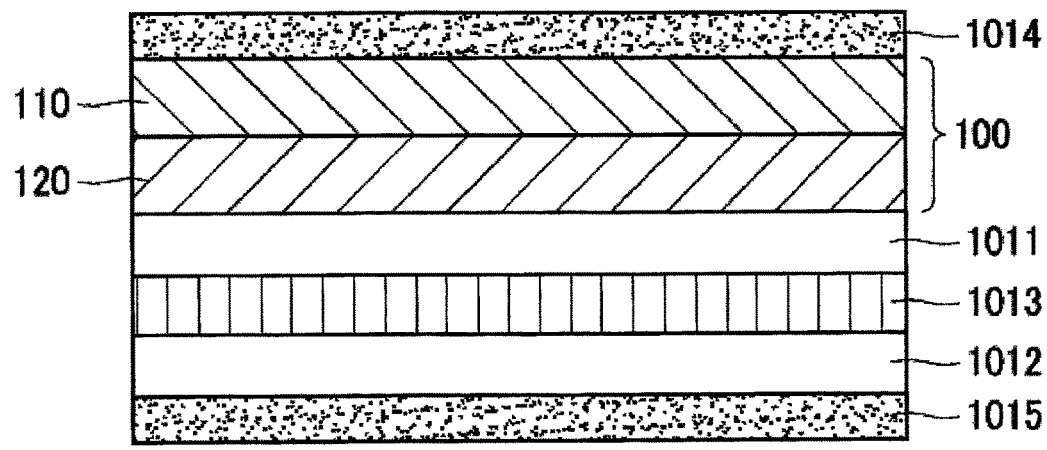

ANISOTROPIC OPTICAL FILM

TECHNICAL FIELD

The present invention relates to an anisotropic optical film which changes the diffusibility of transmitted light depending on the incident angle of incident light.

BACKGROUND ART

Devices that can be used as display devices include, for example, liquid crystal panels, organic electroluminescence (ELs), plasma display panels (PDPs), field emission displays (FEDs), and rear projectors. Among these devices, liquid crystal display devices that use the liquid crystal display panels are generally and widely used.

For a liquid crystal panel in a conventional liquid crystal display device, a nematic liquid crystal is sandwiched between a pair of transparent glass substrates with transparent electrodes formed, and a pair of polarization plates is provided on both sides of the glass substrates. However, the liquid crystal display device using the thus configured liquid crystal display panel exhibits favorable display characteristics with respect to the normal direction of the liquid crystal display panel, but has the problem of significantly degraded display characteristics with respect to directions tilted vertically or horizontally at a specific angle or more to the normal line of the liquid crystal display panel.

As one of causes for the significantly decreased display characteristics, a phenomenon is caused such that the contrast between light and dark, which is favorable in the normal direction of the panel, is significantly degraded in directions tilted vertically or horizontally at a specific angle or more to the normal line, thereby inversing the light and dark on the screen in some cases. This phenomenon is referred to as a gradation inversion on the screen. Similarly, a phenomenon is also caused such that the brightness on the screen, which is high in the normal direction of the panel, is significantly degraded in directions tilted vertically or horizontally at a specific angle or more to the normal line. It is to be noted that the angle from the normal direction of the panel is referred to as a viewing angle, at which the display is normal without causing such a phenomenon, or significantly changing the contrast or brightness on the screen.

In order to remedy such problems (in particular, the phenomenon of degraded contrast or brightness) with display characteristics, thereby expanding the viewing angle, an anisotropic optical film is used which is able to change the linear transmitted light quantity depending on the incident angle of the incident light. As such an anisotropic optical film, an anisotropic diffusion medium is disclosed where an assembly of pillar-like cured regions all extending parallel to a predetermined direction P is formed within a resin layer composed of a cured product of a composition including a photo-polymerizable compound (for example, see Patent Literature 1). The anisotropic optical film in question is known to have a viewing angle somewhat improved by attaching the film to the observed surface side of a liquid crystal display device. Hereinafter, in this specification, the terms of "photo-polymerization" and "curing" are considered to mean a polymerization reaction of a photo-polymerizable compound with light, and both used as synonyms.

In addition, since the anisotropic optical film in Patent Literature 1 can somewhat improve the viewing angle in a direction close predetermined direction, but has failed to achieve enough improvement in viewing angle, an anisotropic optical film is proposed which can expand the viewing angle adequately in any direction (for example, see Patent Literature 2). This anisotropic optical film has a number of anisotropic light diffusion layers stacked, with the use of the anisotropic light diffusion layers which have an incident angle dependence of transmission and diffusion of incident light on the angle of intersection between an axis of scattering center of an anisotropic light diffusion layer and the optical axis of incident light onto the anisotropic light diffusion layer, and have the length direction of the axis of scattering center projected onto the surface of the anisotropic light diffusion layer in closer to a direction of wishing to expand the viewing angle. The anisotropic optical film in question is supposed to be able to expand the viewing angle of a display panel, in particular, a liquid crystal display panel adequately in any direction.

CITATION LIST

Patent Literature

Patent Literature 1: JP 2005-265915 A
Patent Literature 2: WO 2008/053592

SUMMARY OF INVENTION

Technical Problem

However, when the single layer of anisotropic optical film described in Patent Literature 1 is used for a display panel such as a liquid crystal display panel, there is a problem that even when the brightness and the contrast can be improved in the direction of the viewing angle, the brightness and the contrast are significantly degraded in the other directions (for example, the normal direction of the panel).

In addition, when the anisotropic optical film with the number of anisotropic light diffusion layers stacked as described in Patent Literature 2 is used for a display panel such as a liquid crystal display panel, just varying the direction of the axis of scattering center for each anisotropic light diffusion layer can expand the viewing angle, but still significantly degrades the brightness or contrast in the directions other than the direction of the viewing angle in some cases.

Therefore, the present invention has been made in order to solve the problems mentioned above, and an object of the invention is to provide an anisotropic optical film, which can, while keeping excellent display characteristics (e.g., brightness and contrast) in the direction of a viewing angle, suppress decreased display characteristics in the other directions, when the anisotropic optical film is used as a diffusion film of a display panel.

Solution to Problem

The inventors have, as a result of carrying out earnest studies in order to solve the problems mentioned above, found that stacking two or more anisotropic light diffusion layers that differ in transmittance and diffusion intensity and making the transmittance and diffusion intensity for each anisotropic light diffusion layer within specified ranges make it possible to achieve a balance between the improvement of transmittance in a non-diffusion region that is an incident angle range for higher linear transmittance and the expansion of a diffusion region (the increase of the diffusion width) that is an incident angle range for lower linear transmittance (that is, higher diffusion intensity). In addition, the inventors have found that the use of, for a liquid crystal display panel or the like, an anisotropic optical film which achieves a balance between the improvement of transmittance in the non-diffusion region and the expansion of the diffusion region can, while keeping excellent display characteristics (e.g., brightness and contrast) in the direction of the viewing angle, suppress decreased display characteristics in the other directions, and based on these finding, have achieved the present invention.

More specifically, the present invention is directed to an anisotropic optical film including two or more anisotropic light diffusion layers where the linear transmittance varies depending on the incident angle of incident light, characteristically each of the anisotropic light diffusion layers has a matrix region and a number of pillar regions that differ in refractive index from the matrix region, the film includes, as the anisotropic light diffusion layers, at least two types of anisotropic light diffusion layers (a) and (b) that differ in linear transmittance, the anisotropic light diffusion (a) has a maximum linear transmittance of 40% or more and less than 95% as the linear transmittance of incident light at an incident angle that maximizes the linear transmittance, and has a minimum linear transmittance of less than 20% as the linear transmittance of incident light at an incident angle that minimizes the linear transmittance, and the maximum linear transmittance of the anisotropic light diffusion layer (b) is 20% or more and less than 40%, and the minimum linear transmittance thereof is less than 20%.

In this regard, in the anisotropic optical film, preferably, the anisotropic light diffusion layers each have at least one axis of scattering center, and when the polar angle $\theta$ ($-90°<\theta<90°$) between the normal line of the anisotropic light diffusion layer and the axis of scattering center is regarded as an angle of the axis of scattering center, the absolute value of a difference is 0° or more and 30° or less between the angle of the axis of scattering center for the anisotropic light diffusion layer (a) and the angle of the axis of scattering center for the anisotropic light diffusion layer (b).

In addition, in the anisotropic optical film, the aspect ratio between a short diameter and a long diameter is preferably less than 2 in a cross section perpendicular to the orientation direction of the pillar regions.

In addition, in the anisotropic optical film, the anisotropic light diffusion layers are preferably each 15 μm or more and 100 μm or less in thickness.

In addition, in the anisotropic optical film, the anisotropic optical film preferably further includes a transparent pressure-sensitive adhesive layer between the plurality of anisotropic light diffusion layers.

Advantageous Effects of Invention

According to the present invention, stacking two or more anisotropic light diffusion layers that differ in transmittance and diffusion intensity and making the transmittance and diffusion intensity for each anisotropic light diffusion layer within specified ranges make it possible to provide an anisotropic optical film which achieves a balance between the improvement of transmittance in the non-diffusion region and the expansion of the diffusion region. Accordingly, when the anisotropic optical film is used as a diffusion film of a display panel, it becomes possible to provide an anisotropic optical film which can, while keeping excellent display characteristics (e.g., brightness and contrast) in the direction of the viewing angle, suppress decreased display characteristics in the other directions.

BRIEF DESCRIPTION OF DRAWINGS

FIG. 1 is a pattern diagram illustrating an example of an anisotropic optical film that has a columnar structure.

FIG. 2 is a pattern diagram illustrating an example of an anisotropic optical film that has a tabular structure.

FIG. 3 is an explanatory diagram illustrating a method for evaluating light diffusibility of an anisotropic optical film.

FIG. 4 is a pattern diagram illustrating an example of an anisotropic optical film where the orientation direction of a pillar region is coincident with the film thickness direction (normal direction) of the film.

FIG. 5 is a pattern diagram illustrating an example of an anisotropic optical film where the orientation direction of a pillar region is not coincident with the film thickness direction (normal direction) of the film.

FIG. 6 is a graph showing the relationship between the incident angle and linear transmittance of incident light onto the anisotropic optical film in FIG. 4.

FIG. 7 is a graph showing the relationship between the incident angle and linear transmittance of incident light onto the anisotropic optical film in FIG. 5.

FIG. 8 is a graph showing an example of an ideal optical profile for an anisotropic optical film for solving a problem of the related art.

FIG. 9 is a pattern diagram illustrating an example of the overall configuration of an anisotropic optical film according to a preferred embodiment of the present invention.

FIGS. 10A and 10B are pattern diagrams illustrating examples of the configurations of anisotropic light diffusion layers in the anisotropic optical film according to the embodiment.

FIG. 11 is a three-dimensional polar coordinate expression for explaining an axis of scattering center in anisotropic light diffusion layers according to the embodiment.

FIG. 12 is a pattern diagram illustrating an example of the configuration of a liquid crystal display panel that uses an anisotropic optical film according to the embodiment.

FIG. 13 a pattern diagram illustrating an example of the configuration of a liquid crystal display panel that uses an anisotropic optical film according to the embodiment.

DESCRIPTION OF EMBODIMENTS

A preferred embodiment of the present invention will be described in detail below with reference to the drawings. It is to be noted that the constituent elements denoted by the same reference signs shall have substantially the same structure or function in the specification and drawings herein.

Further, an anisotropic optical film according to the present embodiment will be described in the following order.
1. Structure and Property of Anisotropic Optical Film
2. Problem of Related Art and Summary of Means for Solving the Problem
3. Configuration of Anisotropic Optical Film according to Present Embodiment
4. Production. Method for Anisotropic Optical Film according to Present Embodiment
5. Intended Use of Anisotropic Optical Film according to Present Embodiment <<Structure and Property of Anisotropic Optical Film>>

First, the structure and properties of single-layer anisotropic optical film (in a case where the "anisotropic optical diffusion layer" specified in the present embodiment is a single layer) will be described with reference to FIGS. 1 to 7, as preparation for describing the anisotropic optical film according to the present embodiment. FIG. 1 is a pattern diagram illustrating an example of an anisotropic optical film that has a columnar structure (as described later). FIG. 2 is a pattern diagram illustrating an example of an anisotropic optical film that has a tabular structure (as described later). FIG. 3 is an explanatory diagram illustrating a method for evaluating light diffusibility of an anisotropic optical film. FIG. 4 is a pattern diagram illustrating an example of an anisotropic optical film where the orientation direction P of a pillar region 13 is coincident with the film thickness direction (normal direction) of the film. FIG. 5 is a pattern diagram illustrating an example of an anisotropic optical film where the orientation direction P of a pillar region 23 is not coincident with the film thickness direction (normal direction) of the film. FIG. 6 is a graph showing the relationship between the incident angle and linear transmittance of incident light onto the anisotropic optical film in FIG. 4. FIG. 7 is a graph showing the relationship between the incident angle and linear transmittance of incident light onto the anisotropic optical film in FIG. 5.

(Structure of Anisotropic Optical Film)

The anisotropic optical film is a film where a region that differs in refractive index from a matrix region of the film is formed in the film thickness direction of the film. The shape of the region that differs in refractive index is not particularly limited, but there are, for example, as shown in FIG. 1, an anisotropic optical film of a matrix region 11 with a pillar region 13 formed therein in the shape of a pillar, a rod, or the like to differ in refractive index (hereinafter, which may be referred to as an "anisotropic optical film that has a columnar structure") 10, as shown in FIG. 2, an anisotropic optical film of a matrix region 51 with a plate-like region 53 formed therein substantially in the shape of a plate to differ in reactive index (hereinafter, which may be referred to as an "anisotropic optical film that has a tabular structure") 50, and although not shown, a hybrid-type anisotropic optical film that has a columnar structure and a tabular structure mixed therein.

(Property of Anisotropic Optical Film)

The anisotropic optical film that has the structure described above is a light diffusion film that varies a light diffusibility (transmittance) depending on the incident angle of incident light onto the film, that is, has a dependence on the incident angle. Light incident at a predetermined angle onto the anisotropic optical film is preferentially diffused when the light is substantially parallel to the orientation direction of the region that differs in refractive index (for example, the extending direction (orientation direction) of the pillar region 13 in the case of the columnar structure, or the height direction of the plate-like region 53 in the case of the tabular structure), or preferentially transmitted when the light is not parallel to the direction.

In this regard, light diffusibility of the anisotropic optical film will be described more specifically with reference to FIGS. 3 to 7. Light diffusibility of the anisotropic optical film 10 (see FIG. 4) where the orientation direction P of the pillar region 13 is coincident with the film thickness direction (normal direction) of the film, and of the anisotropic optical film 20 (see FIG. 5) where the orientation direction P of the pillar region 23 is not coincident with the film thickness direction (normal direction) of the film will be described herein as examples, in regard to the anisotropic optical film that has the columnar structure described above. It is to be noted that the orientation direction P of the pillar region 23 of the anisotropic optical film 20 is direction that is tilted at approximately 20° from the normal direction of the film.

A method for evaluating the light diffusibility was implemented in the following way. First, as shown in FIG. 3, the anisotropic optical films 10, 20 are disposed between a light source 1 and a detector 2. In the present embodiment, the incident angle was regarded as 0°, when irradiation light I from the light source 1 is incident from the normal direction of the anisotropic optical films 10, 20. In addition, the anisotropic optical films 10, 20 are disposed to be optionally rotatable around a line L, and the light source 1 and the detector 2 are fixed.

The anisotropic optical films 10, 20 were evaluated respectively for light diffusibility when the axes A-A (the axes in the radial (side) directions of the anisotropic optical films) in FIGS. 4 and 5 were selected for the line L as a center of rotation as shown in FIG. 3 (rotational direction A), and when the axes B-B (axes perpendicular to the axes A-A) therein were selected for the line L as a center of rotation as shown in FIG. 3 (rotational direction B). FIG. 6 shows the result of evaluating the light diffusibility obtained by rotating the anisotropic optical film 10 disposed in each of the rotational direction A and the rotational direction B. Likewise, FIG. 7 shows the result of evaluating the light diffusibility obtained by rotating the anisotropic optical film 20 disposed in the rotational direction B. In this regard, FIGS. 6 and 7 corresponds to measurements achieved by the method shown in FIG. 3, where the vertical axis indicates a linear transmittance (linear transmittance=the amount of light detected by the detector 20 in the presence of the anisotropic optical films 10, 20/the amount of light detected by the detector 20 in the absence of the anisotropic optical films 10, 20), whereas the horizontal axis indicates an incident angle onto the anisotropic optical films 10, 20.

As shown in FIG. 6, in the case of the anisotropic optical film 10 where the orientation direction P of the pillar region 13 is coincident with the film thickness direction (normal direction) of the film, the linear transmittance varies depending on the incident angle of incident light. In addition, the anisotropic optical film 10 exhibits almost the same optical profile in the case of selecting the axis A-A for the line L, and in the case of selecting the axis B-B perpendicular to the axis A-A for the line L. In this regard, the optical profile in this specification means a curve that indicates an incident angle dependence of light diffusibility as shown in FIGS. 6 and 7. The optical profile is not intended to directly represent the light diffusibility, but can be considered to generally represent the light diffusibility as long as a decrease in linear transmittance is in turn taken as an increase in diffuse transmittance. While a normal isotropic light diffusion film exhibits a mountain-like optical profile with a peak around 0°, the anisotropic optical film 10 exhibits, without dependence on the arrangement direction (the axial direction of A-A and the axial direction of B-B) thereof, almost the same linear transmittance even when the central axis of rotation (the axis selected as the line L) is changed, and exhibits a valley-like optical profile where the linear transmittance reaches a minimum value once at an incident angle of ±5 to 10°, increases as (the absolute value of) the incident angle increases, and reaches a maximum value at an incident angle of +45 to 60°, as compared with the transmittance in the case of incidence in the normal direction (0°). As just described, the anisotropic optical film 10 has the property that incident light is intensively diffused in the incident angle range of ±5 to 10° close to the normal direction (that is, the orientation direction P of the pillar region 13), while the diffusion is attenuated to increase the linear transmittance in the other larger incident angle range. Hereinafter, the angular range for ½ of the difference between the maximum linear transmittance and the minimum linear transmittance is referred to as a diffusion region (diffusion width), whereas the other angular range is referred to as a non-diffusion region (transmission region).

In addition, the valley-like optical profile shown in FIG. 6 is symmetric with respect to an axis around the incident angle of 0° (in particular, around the maximum value that exists between the two minimum values), and this axis is referred to as an axis of scattering center in the present embodiment. More specifically, the axis of scattering center means a direction that is coincident with an incident angle of the light, where a light diffusibility of the light is substantially symmetric with respect to the incident angle when the incident angle is varied. In this regard, the reason for being substantially symmetric is used because the optical profile is not strictly symmetric when the axis of scattering center is tilted with respect to the normal direction of the film. In the anisotropic optical film 10, the axis of scattering center is parallel to the orientation direction P of the pillar region 13.

In this regard, in terms of the axis of scattering center to be parallel to the orientation direction P of the pillar region, the law of refractive index (Snell's law) only has to be satisfied, and there is no need to be strictly parallel. The Snell's law is that the relation of $n_1 \sin \theta_1 = n_2 \sin \theta_2$ is established between an incident angle $\theta_1$ and a refractive index $\theta_2$ when light is incident from a medium with a refractive index $n_1$ to the interface of a medium with a refractive index $n_2$. For example, with $n_1=1$ (air) and $n_2=1.51$ (anisotropic optical film), the orientation direction (refraction angle) of the pillar region is approximately 19° when the tilt (incident angle) of the axis of scattering center is 30°, and even when the incident angle is different from the refraction index as just described, the difference falls into the concept of parallelism in the present embodiment as long as the Snell's law is satisfied.

Next, as shown in FIG. 7, the anisotropic optical film 20 where the orientation direction P of the pillar region 13 is not coincident with the film thickness direction (normal direction) of the film is similar to the anisotropic optical film 10 in that the linear transmittance varies depending on the incident angle of incident light. However, although not shown, different optical profiles are exhibited between when the axis A-A is selected for the line L and when the axis B-B perpendicular to the axis A-A is selected for the line L, because the orientation direction P of the pillar region 13 is not coincident with the normal direction of the film. In addition, the anisotropic optical film 20 exhibits a valley-like optical profile including minimum values around incident angles of 15° and 30° with respect to a center around an incident angle of 20°. As just described, the anisotropic optical film 20 has the property that incident light is intensively diffused in the incident angle range (diffusion region) close to a direction of 20° tilt from the normal direction (that is, the orientation direction P of the pillar region 13), while the diffusion is attenuated to increase the linear transmittance in the other larger incident angle range (non-diffusion region). In addition, the valley-like optical profile shown in FIG. 7 is symmetric with respect to an axis around the incident angle of 20° (in particular, around the maximum value that exists between the two minimum values), and the axis of scattering center of the anisotropic optical film 20 can be considered as the direction of approximately 20°, and is parallel to the orientation direction P of the pillar region 13.

As just described, the anisotropic optical film that has a columnar structure (when the anisotropic light diffusion layer has only a single layer) has the property that light is intensively diffused in the direction of the axis of scattering center and an incident angle range (diffusion region) close to the axis, while the linear transmittance is increased further away from the direction of the axis of scattering center.

<<Problem of Related Art and Summary of Means for Solving the Problem>>

Next, problems of anisotropic optical films in the related art and means for solving the problems will be described in summary.

(Problem of Related Art)

When an anisotropic optical film including only one layer of anisotropic light diffusion layer that has a columnar structure as described above is used for a liquid crystal display panel or the like, the appropriate adjustment to the axis of scattering center can widen the viewing angle to some extent, and improve the brightness and contrast in the direction of the viewing angle.

However, the use of the anisotropic optical film including only one layer of anisotropic light diffusion layer that has a columnar structure in an attempt to improve the brightness and contrast in the direction of the viewing angle causes the phenomenon of substantially decreasing the brightness and contrast in the other directions (for example, the normal direction of the display panel) other than the direction of the viewing angle. In addition, when an attempt is made to further widen the viewing angle, the brightness and contrast in the other directions other than the direction of the viewing angle are significantly decreased.

The inventors have considered causes for the phenomena to find that in the case of an anisotropic optical film including only one layer of anisotropic light diffusion layer that has a columnar structure, the improvement of linear transmittance in the non-diffusion region in an attempt to improve the brightness and contrast of the film reduces the diffusion region, thus leading to a narrower viewing angle, while the attempt to expand the diffusion region in an attempt to widen the viewing angle decreases the linear transmittance in the non-diffusion region. More specifically, the inventory have found that it is difficult to achieve a lance between the improvement of linear transmittance in the non-diffusion region and the expansion of the diffusion region (diffusion width), in the case of an anisotropic optical film including only one layer of anisotropic light diffusion layer that has a columnar structure.

(Summary of Means for Solving Problem in Related Art)

In order to solve the problem, as shown by a heavy line in FIG. 8, it is considered ideal that the anisotropic optical film has a high linear transmittance in the non-diffusion region, and a wide diffusion region (diffusion width). Therefore, the inventors have carried out further studies in order to obtain an anisotropic optical film which achieves a balance between the improvement of linear transmittance in the non-diffusion region and the expansion of the diffusion region (diffusion width). As a result, it has been found that it is insufficient to just vary the direction of the axis of scattering center for each anisotropic light diffusion layer as described in Patent Literature 2, and stacking two or more anisotropic light diffusion layers that differ in linear transmittance and diffusion intensity and making the maximum linear transmittance and minimum linear transmittance (diffusion intensity) for each anisotropic light diffusion layer within specified ranges make it possible to achieve a balance between the improvement of linear transmittance in the non-diffusion region and the expansion of the diffusion region (diffusion width).

In addition, the inventors have also found together that it is effective to stack anisotropic light diffusion layers with axes of scattering center shifted in a specified angle range in order to expand the diffusion region (diffusion width) in a further effective manner.

As described above, the anisotropic optical film obtained by stacking two or more anisotropic light diffusion layers that has a linear transmittance (maximum linear transmittance) and a diffusion intensity (minimum linear transmittance) in specified ranges, and differ from each other in linear transmittance and diffusion intensity makes it possible to achieve a balance between the improvement of linear transmittance in the non-diffusion region and the expansion of the diffusion region (diffusion width). Accordingly, the use of such an anisotropic optical film for a liquid crystal display panel or the like can improve display characteristics (e.g., brightness and contrast) in the direction of the viewing angle, and at the same time, suppress degradation of display characteristics in the other directions. Hereinafter, an anisotropic optical film according to the present embodiment made on the basis of these findings, will be described in detail.

<<Configuration of Anisotropic Optical Film According to Present Embodiment>>

The configuration of an anisotropic optical film 100 according to the present embodiment will be described with reference to FIGS. 9 and 10. FIG. 9 is a pattern diagram illustrating an example of the overall configuration of the anisotropic optical film 100 according to the present embodiment. FIGS. 10A and 10B are pattern diagrams illustrating examples of the configurations of anisotropic light diffusion layers 110, 120 in the anisotropic optical film 100 according to the present embodiment, where FIG. 10A illustrates the configuration of the anisotropic light diffusion layer 110, whereas FIG. 10B illustrates the configuration of the anisotropic light diffusion layer 120.

<<Overall Configuration>>

As shown in FIG. 9, the anisotropic optical film 100 is an anisotropic optical film that has the two layers of anisotropic light diffusion layers 110, 120 stacked. The anisotropic optical film according to the present invention needs to have, as anisotropic light diffusion layers, at least an anisotropic light diffusion layer (a) that is relatively higher in transmittance of incident light and an anisotropic light diffusion layer (b) that is relatively lower in transmittance of incident light (higher in diffusion intensity). The anisotropic optical film 100 according to the present embodiment has, as the anisotropic light diffusion layer (a), the anisotropic light diffusion layer 110 stacked on the upper layer side, and has, as the anisotropic light diffusion layer (b), the anisotropic light diffusion layer 120 stacked on the lower layer side. However, in the present invention, the order of stacking the anisotropic light diffusion layer (a) and the anisotropic light diffusion layer (b) is not particularly limited, but the anisotropic light diffusion layer 110 and anisotropic light diffusion layer 120 according to the present embodiment may be respectively stacked on the lower layer side and the upper layer side. It is to be noted that while the configuration of two anisotropic light diffusion layers stacked is presented in the present embodiment, three or more anisotropic light diffusion layers stacked may be adopted as the anisotropic optical film according to the present invention.

In addition, a transparent pressure-sensitive adhesive layer 130 is further stacked between the respective anisotropic light diffusion layer 110 and 120. This pressure-sensitive adhesive layer 130 may be provided, if necessary, but is preferred because the presence of the pressure sensitive adhesive layer 130 somewhat increases the maximum value of the transmittance in the non-diffusion region of the anisotropic optical film 100 and somewhat widens the width (diffusion width) of the diffusion region as presented in examples described later. In this regard, when the anisotropic optical film has three or more anisotropic light diffusion layers, the pressure sensitive pressure-sensitive adhesive layer may be provided between all of the anisotropic light diffusion layers, the pressure-sensitive adhesive layer may be provided only between some of the anisotropic light diffusion layers, or all of the anisotropic light diffusion layers may be stacked without any pressure-sensitive adhesive layer.

<Anisotropic Light Diffusion Layers 110, 120>

The respective anisotropic light diffusion layers 110, 120 constituting the anisotropic optical film 100 have the same configuration as the single layer of anisotropic optical film 10, 20, or the like described above, and has a light diffusibility that the linear transmittance varies depending on the incident angle of incident light. In addition, as shown in FIG. 10, the anisotropic light diffusion layers 110, 120, each composed of a cured product of a composition including a photopolymerizable compound, respectively have matrix regions 111, 121 and a number of pillar regions 113, 123 that differ in refractive index from the matrix regions 111, 121. The orientation directions (extending directions) P of the pillar regions 113, 123 are formed to be parallel to axes of scattering center, and appropriately determined such that the anisotropic light diffusion layers 110, 120 have a desired transmittance and diffusibility. Such structures can be formed by, although described later in detail, for example, providing a composition including a photopolymerizable compound in the form of a sheet, and irradiating the sheet with light rays parallel to a desired axis of scattering center from a light source, thereby curing the composition, and the parts irradiated with the light rays serve as the pillar regions 113, 123, whereas the parts irradiated with no light beam serves as the matrix regions 111, 121. It is to be noted that in regard to the concept of "parallelism", as described above, any difference falls into the concept of parallelism in the present embodiment as long as the Snell's law is satisfied.

(Pillar Region)

In addition, the pillar regions 113, 123 according to the present embodiment are provided as numbers of pillar or rod cured regions in the matrix regions 111, 121, and the respective pillar regions 113, 123 are formed such that the respective orientation directions P are parallel to the axes of scattering center. Accordingly, the number of pillar regions (for example, pillar regions 113) in the same anisotropic light diffusion layer (for example, the anisotropic light diffusion layer 110) is formed to be parallel to each other. In addition, as for the shapes of the pillar regions 113, 123, cross-sectional shapes of the pillar regions 113, 123 perpendicular to the orientation directions P are not particularly limited as long as pillar or rod shapes are provided. For example, while the cross-sectional shapes of the pillar regions 113, 123 are shown as circular shapes in FIGS. 10A and 10B, the cross-sectional shapes of the pillar regions 113, 123 are not limited to the circular shapes, nor to an elliptic shape, a polygonal shape, an indefinite shape, or the like. However, in order to achieve the improvement of linear transmittance in the non-diffusion region of the anisotropic optical film 100 and the expansion of the diffusion region (diffusion width) thereof in a further effective manner, the aspect ratio between a shorter diameter and a longer diameter in cross sections of the pillar regions 113, 123 is preferably less than 2, more preferably less than 1.5.

(Linear Transmittance)

The anisotropic light diffusion layer 110 is, as described above, a layer corresponding to the anisotropic light diffusion layer (a) as a layer that is relatively higher in transmittance. In this regard, when the linear transmittance of incident light onto the anisotropic light diffusion layer 110 at an incident angle that maximizes the linear transmittance is defined as a "maximum linear transmittance", whereas the linear transmittance of incident light onto the anisotropic light diffusion layer 110 at an incident angle that minimizes the linear transmittance is defined as a "minimum linear transmittance", the maximum linear transmittance of the anisotropic light diffusion layer 110 needs to be 40% or more and less than 95%, whereas the minimum linear transmittance thereof needs to be less than 20%.

In addition, the anisotropic light diffusion layer 120 is, as described above, a layer corresponding to the anisotropic light diffusion layer (b) as a layer that is relatively lower in transmittance (higher in diffusion intensity). In this regard, when the linear transmittance of incident light onto the anisotropic light diffusion layer 120 at an incident angle that maximizes the linear transmittance is defined as a "maximum linear transmittance", whereas the linear transmittance of incident light onto the anisotropic light diffusion layer 120 at an incident angle that minimizes the linear transmittance is defined as a "minimum linear transmittance", the maximum linear transmittance of the anisotropic light diffusion layer 120 needs to be 20% or more and less than 40%, whereas the minimum linear transmittance thereof needs to be less than 20%.

The adjustment of the maximum linear transmittance and the minimum linear transmittance in the ranges mentioned above for the anisotropic light diffusion layer 110 (corresponding to the anisotropic light diffusion layer (a) that is relatively higher in transmittance) and the anisotropic light diffusion layer 120 (corresponding to the anisotropic light diffusion layer (b) that is relatively higher in diffusion intensity) makes it possible to achieve a balance between the improvement of linear transmittance in the non-diffusion region and the expansion of the diffusion region (diffusion width) in the anisotropic optical film 100. In other words, when any one of the maximum linear transmittance and minimum linear transmittance of the anisotropic light diffusion layer 110 as well as the maximum linear transmittance and minimum linear transmittance of the anisotropic light diffusion layer 120 falls outside the ranges mentioned above, it is impossible to achieve a balance between the improvement of linear transmittance in the non-diffusion region and the width (diffusion width) of the diffusion region. The use of, as a diffusion film of a display device, the anisotropic optical film 100 obtained by stacking the anisotropic light diffusion layer 110 and the anisotropic light diffusion layer 120 which have the ranges mentioned above for the maximum linear transmittance and the minimum linear transmittance can improve display characteristics (e.g., brightness and contrast) in the direction of the viewing angle, and at the same time, suppress degradation of display characteristics in the other directions.

In order to further improve the linear transmittance in the non-diffusion region, and further expand the width (diffusion width) of the diffusion region, the anisotropic light diffusion layer 110 (corresponding to the anisotropic light diffusion layer (a) that is relatively higher in transmittance) preferably has a maximum linear transmittance of 55% or more and less than 70%, and a minimum linear transmittance of 15% or less, whereas the anisotropic light diffusion layer 120 (corresponding to the anisotropic light diffusion layer (b) that is relatively higher in diffusion intensity) preferably has a maximum linear transmittance of 30% or more and less than 40%, and a minimum linear transmittance of 5% or less.

In this regard, the maximum linear transmittance and minimum linear transmittance for the anisotropic light diffusion layers 110, 120 can be adjusted with design parameters for manufacture. Examples of the parameters include the composition of a coating film, the film thickness of a coating film, and a temperature applied to a coating film in the formation of a structure. The maximum linear transmittance and the minimum linear transmittance are changed by appropriately selecting and blending constituents for the composition for a coating film. As for the design parameters, the maximum linear transmittance and the minimum linear transmittance are more likely to be decreased as the film thickness is larger, and more likely to be increased as the thickness is smaller. The maximum linear transmittance and the minimum linear transmittance are more likely to be decreased as the temperature is higher, and more likely to be increased as the temperature is lower. The combination of the parameters makes it possible to appropriately adjust each of the maximum linear transmittance and the minimum linear transmittance.

(Axis of Scattering Center)

Next, an axis of scattering center Q in the anisotropic light diffusion layers 110, 120 will be described with reference to FIG. 11. FIG. 11 is a three-dimensional polar coordinate expression for explaining the axis of scattering center Q in the anisotropic light diffusion layers 110, 120.

The anisotropic light diffusion layers 110, 120 each have at least one axis of scattering center, and the axis of scattering center means, as described above, a direction that is coincident with an incident angle light of which a light diffusibility is substantially symmetric with respect to the incident angle, when the incident angle onto the anisotropic light diffusion layer 110, 120 is varied. It is to be noted that the incident angle in this case refers to a substantially central part sandwiched between minimum values (a central part in the diffusion region) on an optical profile measured for the anisotropic light diffusion layer 110, 120.

In addition, the axis of scattering center can be expressed by a polar angle $\theta$ and an azimuth $\varphi$ when the surface of the anisotropic light diffusion layer 110, 120 is regarded as an xy plane while the normal line is regarded as a z axis according to the three-dimensional polar coordinate expression as shown in FIG. 11. More specifically, $P_{xy}$ in FIG. 11 can be considered as the length direction of the axis of scattering center projected onto the surface of the anisotropic light diffusion layer 110, 120.

In this regard, when the polar angle $\theta$ ($-90°<\theta<90°$) between the normal line (the z axis shown in FIG. 11) of the anisotropic light diffusion layer 110, 120 and the axis of scattering center Q is defined as the angle of the axis of scattering center, the absolute value of the difference is preferably 0° or more and 30° or less between the angle of the axis of scattering center for the anisotropic light diffusion layer 110 (corresponding to the anisotropic light diffusion layer (a) that is relatively higher in transmittance) and the angle of the axis of scattering center for the anisotropic light diffusion layer 120 (corresponding to the anisotropic light diffusion layer (b) that is relatively higher in diffusion intensity). The absolute value of the difference between the angles of the axes of scattering center within the range mentioned above makes it possible to further expand the width of the diffusion region without decreasing the linear transmittance in the non-diffusion region of the anisotropic optical film 100. In order to achieve this effect in a more effective manner, the absolute value of the difference is more preferably 0° or more and 20° or less between the angle of the axis of scattering center for the andsotropic light diffusion layer 110 and the angle of the axis of scattering center for the anisotropic light diffusion layer 120. In manufacturing, it is to be noted that the angles of the axes of scattering center for the anisotropic light diffusion layers 110, 120 can be adjusted to desired angles by changing the directions of light rays for irradiating the composition including the photopolymerizable compound in the form of the sheet. It is to be noted that the plus and minus of the angle of the axis of scattering center shall be defined as + when the axis of scattering center is tilted to one side and as − when the axis is tilted to the other side, with respect to a plane passing through both a predetermined axis of symmetry in the planar direction of the anisotropic light diffusion layer 110, 120 (for example, the axis B-B in FIGS. 4 and 5) and the normal line of the anisotropic light diffusion layer 110, 120. For example, when the anisotropic light diffusion layer 110, 120 is rotated around the axis B-B in FIG. 5 as a center of rotation, the +/− of the incident angle in FIG. 7 corresponds with the +/− of the angle of the axis of scattering center.

In addition, in addition to the fact that the absolute value of the difference between the angles of the axes of scattering center (polar angles) satisfies the range mentioned above, the absolute value of the difference is preferably 0° or more and 20° or less between the azimuth of the axis of scattering center for the anisotropic light diffusion layer 110 and the azimuth of the axis of scattering center for the anisotropic light diffusion layer 120. This makes it possible to further expand the width of the diffusion region without decreasing the linear transmittance in the non-diffusion region of the anisotropic optical film 100.

In this regard, the anisotropic light diffusion layers 110, 120 may each have, in the single layer, multiple groups of pillar regions (each including an assembly of pillar regions that have an identical tilt) that differ in tilt. As just described, when there are multiple groups of pillar regions that differ in tilt in a single layer, there are also multiple axes of scattering center in response to the tilt for each group of pillar regions. When there are multiple axes of scattering center, at least one axis of scattering axis among the multiple axes of scattering center has only to meet the above-mentioned condition for the angle of the axis of scattering center. For example, when the anisotropic light diffusion layer 110 have two axes of scattering center Q1, Q2, whereas the anisotropic light diffusion layer 120 have two axes of scattering center Q3, Q4, the absolute value of difference between at least either one angle of the axes of scattering center Q1 and Q2 and at least either one angle of the axes of scattering center Q3 and Q4 preferably has 0° or more and 30° or less, more preferably 0° or more and 20° or less.

In addition, the polar angles θ of the axes of scattering center Q (that is, the angle of the axis of scattering center) for the respective anisotropic light diffusion layers 110, 120 are preferably ±10 to 60°, more preferably ±30 to 45°. When the angle of the axis of scattering center is more than −10° and less than +10°, it is impossible to improve the contrast or brightness sufficiently in the direction of the viewing angle of a display panel including a liquid crystal display panel. On the other hand, when the angle of the axis of scattering center is more than +60 or less than −60°, there is a need to irradiate the composition including the photopolymerizable compound, which is provided in the form of a sheet, with light at a great tilt in the manufacturing process, which is not preferred because the inefficiency of irradiation light absorption is disadvantageous in manufacturing.

(Refractive Index)

The anisotropic light diffusion layers 110, 120 are obtained by curing the composition including the photopolymerizable compound, and the following combinations are able to be used as the composition,
(1) a composition that uses a single photopolymerizable compound as will be described later
(2) a composition that uses a mixture of multiple photopolymerizable compounds as will be described later
(3) a composition that uses a mixture of the single or multiple photopolymerizable compounds and a non-polymerizable polymer compound In each of the foregoing combinations, the light irradiation is presumed to form, on a micron scale, microscopic structures that differ in refractive index in the anisotropic light diffusion layers 110, 120, which is believed to show unique anisotropic light diffusion characteristics as presented in the present embodiment. Accordingly, the change in refractive index is preferably larger between before and after photopolymerization in the case (1), and it is preferable to combine multiple materials that differ in refractive index in the case of (2) and (3). It is to be noted that the change in refractive index or the difference in refractive index herein refers to a change or a difference of, specifically, 0.01 or more, preferably 0.05 or more, more preferably 0.10 or more.

(Thickness of Each Layer)

The anisotropic light diffusion layers 110, 120 are each preferably 15 μm or more and 100 μm or less in thickness. The thicknesses within the range mentioned above can achieve, in a more effective manner, the improvement of linear transmittance in the non-diffusion region of the anisotropic optical film 100 and the expansion of the diffusion region (diffusion width) thereof. It is to be noted that when the anisotropic optical film has three or more anisotropic light diffusion layers, each anisotropic light diffusion layer is preferably 15 μm or more and 100 μm or less in thickness.

<Other Embodiment of Anisotropic Optical Film>

The anisotropic optical film 100 according to the present embodiment is obtained by stacking multiple anisotropic light diffusion layers (the anisotropic light diffusion layers 110, 120 according to the present embodiment) made from a cured product of the composition including the photopolymerizable compound, and the stacked body may be stacked on a light-transmitting base, or light-transmitting bases may be stacked on both sides of the stacked body. In this regard, as the light-transmitting base, a base with higher transparency is favorable, a base with a total light transmittance (JIS K7361-1) of 80% or more, more preferably 85% or more, most preferably 90% or more can be used in a preferred manner, and a base with a haze value (JIS K7136) of 3.0 or less, more preferably 1.0 or less, most preferably 0.5 or less can be used in a preferred manner. Specifically, it is possible to use, as the light-transmitting base, a transparent plastic film, a glass plate, or the like, and a plastic film is preferred in terms of thinness, lightness, toughness, excellence in productivity. Specific examples include polyethylene terephthalate (PET), polyethylene naphthalate (PEN), triacetin cellulose (TAC), polycarbonate (PC), polyethersulfone (PES), cellophane, polyethylene (PE), polypropylene (PP), polyvinyl alcohol (PVA), and cycloolefin resin, which can be used alone or in mixture, and further in a stack. In addition, the thickness of the light-transmitting base is, in consideration of use application and productivity, preferably 1 µm to 5 mm, more preferably 10 to 500 µm, and further preferably 50 to 150 µm.

<<Production Method for Anisotropic Optical Film According to Present Embodiment>>

While the configuration of the anisotropic optical film 100 according to the present embodiment has been described above in detail, a method for manufacturing the thus configured anisotropic optical film 100 will be subsequently described.

The anisotropic optical film 100 according to the present embodiment is obtained by stacking the anisotropic light diffusion layers 110, 120 in a direct manner or with the pressure-sensitive adhesive layer 130 interposed therebetween, and the respective anisotropic light diffusion layers 110, 120 can be manufactured by irradiating a specific photopolymerizable resin layer with light rays such as UV under a special condition. Hereinafter, raw materials for the anisotropic light diffusion layers 110, 120 will be described first, and a manufacturing process will be then described.

<Raw Materials for Anisotropic Light Diffusion Layer>

The raw materials for the anisotropic light diffusion layers 110, 120 will be described in the order of (1) photopolymerizable compound; (2) photoinitiator; (3) blend proportion; and other optional components.

(Photopolymerizable Compound)

The photopolymerizable compound which is a material for forming the anisotropic light diffusion layers 110, 120 according to the present embodiment is a material composed of: a photopolymerizable compound selected from a polymer, an oligomer, or a monomer having a radical-polymerizable or cationic polymerizable functional group; and a photoinitiator, which can be polymerized and cured by irradiation with ultraviolet ray and/or visible ray.

The radial-polymerizable compound mainly contains one or more unsaturated double bonds in a molecule, and specific examples of the compound include acrylic oligomers referred to as, e.g., epoxy acrylate, urethane acrylate, polyester acrylate, polyether acrylate, polybutadiene acrylate, silicone acrylate; and acrylate monomers such as 2-ethylhexyl acrylate, isoamyl acrylate, butoxyethyl acrylate, ethoxy diethyleneglycol acrylate, phenoxyethyl acrylate, tetrahydrofurfuryl acrylate, isonorhornyl acrylate, 2-hydroxyethyl acrylate, 2-hydroxypropyl acrylate, 2-acryloyloxyphthalic acid, dicyclopentenyl acrylate, triethylene glycol diacrylate, neopentyl glycol diacrylate, 1,6-hexanediol diacrylate, EO adduct diacrylate of bisphenol A, trimethylolpropane triacrylate, EO modified trimethylolpropane triacrylate, pentaerythritol triacrylate, pentaerythritol tetraacrylate, ditrimethylolpropane tetraacrylate, and dipentaerythritol hexaacrylate. In addition, these compounds may be each used alone, or two or more of the compounds may be used in mixture. It is to be noted that while it is also use to methacrylates, acrylates are typically preferred rather than methacrylates because of higher photopolymerization rates.

A compound having one or more epoxy groups, vinyl ether groups, or oxetane groups in a molecule can be used as the cationic polymerizable compound. Examples of the compound having an epoxy group include 2-ethylhexyl diglycol glycidyl ether, glycidyl ether of biphenyl, diglycidyl ethers of bisphenols such as bisphenol A, hydrogenated bisphenol A, bisphenol F, bisphenol AD, bisphenol S, tetramethyl bisphenol A, tetramethyl bisphenol F, tetrachlorobisphenol A, tetrabromobisphenol A, polydiglycidyl ethers of novolac resins such as phenol novolac, cresol novolac, brominated phenol novolac, and ortho-cresol novolac, diglycidyl ethers of alkylene glycols such as ethylene glycol, polyethylene glycol, polypropylene glycol, butanediol, 1,6-hexanediol, neopentyl glycol, trimethylol propane, 1,4-cyclohexane dimethanol, EO adducts of bisphenol A, and PO adducts of bisphenol A, glycidyl esters such as a glycidyl ester of hexahydrophthalic acid and a di-glycidyl ester of dimer acid.

The examples of the compound having an epoxy group include further include, but not limited thereto, alicyclic epoxy compounds such as 3,4-epoxycyclohexylmethyl-3',4'-epoxycyclohexanecarboxylate, 2-(3,4-epoxycyclohexyl-5,5-spires-3,4-epoxy)cyclohexane-meta-dioxane, di(3,4-epoxycyclohexylmethyl)adipate, di(3,4-epoxy-6-methylcyclohexylmethyl)adipate, 3,4-epoxy-6-methylcyclohexyl-3',4'-epoxy-6'-methyl cyclohexanecarboxylate, methylenebis(3,4-epoxycyclohexane), dicyclopentadienediepoxide, di(3,4-epoxycyclogexylmethyl)ether of ethylene glycol, ethylenbis(3,4-epoxycyclohexanecerboxylate), lactone-modified 3,4-epoxycyclohexylmethyl-3',4'-epoxycyclohexanecarboxylate, tetra(3,4-epoxycyclohexylmethyl)butanetetracarboxylate, and di(3,4-epoxycyclohexylmethyl)-4,5-epoxytetrahydrophthalate.

Examples of the compound having a vinyl ether group include, but not limited thereto, for example, diethylene glycol divinyl ether, triethylene glycol divinyl ether, butanediol divinyl ether, hexanediol divinyl ether, cyclohexanedimethanol divinyl ether, hydroxybutyl vinyl ether, ethyl vinyl ether, dodecyl vinyl ether, trimethylolpropane trivinyl ether, and propenyl ether propylenecarbonate. It is to be noted that vinyl ether compounds are typically cationic polymerizable, but also able to achieve radical polymerization in combination with acrylates.

In addition, 1,4-bis[(3-ethyl-3-oxetanylmethoxy)methyl] benzene, 3-ethyl-3-(hydroxymethyl)-oxetane, or the like can be used as the compound having an oxetane group.

Further, the foregoing cationic polymerizable compounds may be each used alone, or two or more of the compounds may be used in mixture. The photopolymerizable compound is not limited to the foregoing. In addition, in order to produce an adequate difference in refractive index, into the photopolymerizable compound, fluorine atoms (F) may be introduced for the purpose of decreasing the refractive index, or sulfur atoms (S), bromine atoms (Br), and various types of metal atoms may be introduced for the purpose of increasing the refractive index. Furthermore, as disclosed in JP 2005-514487 A, it is also effective to add, to the photopolymerizable compound described above, functional ultrafine particles of a high refractive index metal oxide such as a titanium oxide ($TiO_2$), a zirconium oxide ($ZrO_2$), and a tin oxide ($SnO_x$) with a photopolymerizable functional group such as an acrylic group, a methacryl group, or an epoxy group introduced to the surfaces of the ultrafine particles.

(Photoinitiator)

Examples of the photoinitiator that can cause polymerization of the radical polymerizable compound include benzophenone, benzyl, Michler's ketone, 2-chlorothioxantone, 2,4-diethyl thioxantone, benzoinethylether, benzoin isopropyl ether, benzoin isobutyl ether, 2,2-diethoxyacetophenone, benzyldimethylketal, 2,2-dimethoxy-1,2-diphenylethane-1-on, 2-hydroxy-2-methyl-1-phenylpropane-1-on, 1-hydroxycyclohexylphenylketone, 2-methyl-1-[4-(methylthio)phenyl]-2-morpholinopropanone-1, 1-[4-(2-hydroxyethoxy)-phenyl]-2-hydroxy-2-methyl-1-propane-1-on, bis (cyclopentadienyl)-bis(2,6-difluoro-3-(pyl-1-yl)titanium, 2-benzyl-2-dimethylamino-1-(4-morpholinophenyl)-butanone-1, and 2,4,6-trimethylbenzoyl diphenylphosphine oxide. In addition, these compounds may be each used alone, or two or more of the compounds may be used in mixture.

In addition, the photoinitiator for the cationic polymerizable compound is a compound that can generate an acid by light irradiation and cause polymerization of the above-described cationic polymerizable compound with the acid generated, and typically, an onium salt or a metallocene complex is used for the compound in a preferred manner. A diazonium salt, a sulfonium salt, an iodonium salt, a phosphonium salt, a selenium salt, or the like is used as the onium salt, and for the counter ion thereof, an anion is used such as $BF_4^-$, $PF_6^-$, $AsF_6^-$, and $SbF_6^-$. Specific examples include, but not limited thereto, 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenyithiophenyl)diphenylsulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, (4-methoxyphenyl) diphenylsulfonium hexafluoroantimonate, (4-methoxyphenyl)phenyliodenium hexafluoroantimonate, bis(4-t-butylpenyl)iodonium hexafluorophosphate, benzyltriphenylphosphonium hexafluoroantimonate, triphenyiselenium hexafluorophosphate, and (η5-isopropylbenzene)(η5-cyclopentadienyl) iron (II) hexafluorophosphate. In addition, these compounds may be each used alone, or two or more of the compounds may be used in mixture.

(The Blend Proportion, Other Optional Component)

In the present embodiment, the photoinitiator mentioned above is combined at 0.01 to 10 parts by weight, preferably to 7 parts by weight, more preferably 0.1 to 5 parts by weight with respect to 100 parts by weight of the photopolymerizable compound. This is because the photo-curable property is degraded at less than 0.01 parts by weight, whereas the harmful effect of internal curable property degraded by only the surface cured, coloring, and blocked formation of pillar structures are caused when the photoinitiator is combined in excess of 10 parts by weight. These photoinitiators are typically used by dissolving the powders directly in the photopolymerizable compound, but the photoinitiators dissolved in high concentrations in minute amounts of solvent in advance can be also used in the case of poor solubility. Such a solvent is further preferably photo-polymerizable, and specifically, examples of the solvent include propylene carbonate and γ-butyrolactone. In addition, it is also possible to add various types of known dyes and sensitizers, in order to improve the photo-polymerizable property. Furthermore, a thermo setting initiator that can cause the photo-polymerizable compound to be cured by heating can be used in combination with the photoinitiator. In this case, heating after light cure can further accelerate and complete polymerization and curing of the photo-polymerizable compound.

In the present embodiment, the anisotropic light diffusion layers 110, 120 can be formed by curing the photo-polymerizable compounds mentioned above alone, or curing a mixed composition of two or more of the compounds. In addition, the anisotropic light diffusion layers 110, 120 according to the present embodiment can be also formed by curing a mixture of the photo-polymerizable compound and a non-photopolymerizable polymer resin. Polymer resins that can be used herein include acrylic resins, styrene resins, styrene-acrylic copolymers, polyurethane resins, polyester resins, epoxy resins, cellulosic resins, vinyl acetate resins, vinyl chloride-vinyl acetate copolymers, and polyvinyl butyral resins. The polymer resin and the photo-polymerizable compound need to have sufficient compatibility before light curing, but it is also possible to use various types of organic solvents and plasticizers, and the like in order to ensure the compatibility. It is to be noted that when an acrylate is used as the photo-polymerizable compound, it is preferable in terms of compatibility to select, the polymer resin from acrylic resins.

In addition, for example, an ethyl acetate, a butyl acetate, acetone, methyl ethyl ketone, methyl isobutyl ketone, cyclohexanone, toluene, xylene, or the like can be used as a solvent in preparing the composition including the photo-polymerizable compound.

<Manufacturing Process>

Next, a method (process) for manufacturing the anisotropic light diffusion layers 110, 120 according to the present embodiment. First, the composition including the photo-polymerizable compound described above (hereinafter, referred to as a "photo-curable composition") is applied onto an appropriate base such as a transparent PET film or provided in the form of a sheet to form a film, thereby providing a photo-curable resin layer. The anisotropic light diffusion layers 110, 120 can be prepared by irradiating the photo-curable resin layer with light after the photo-curable resin layer is dried to vaporize the solvent, if necessary.

(Approach for Providing Composition Including Photo-Polymerizable Compound in the Form of Sheet onto Base)

In this regard, a normal coating method or printing method is applied as an approach for providing the composition including the photo-polymerizable compound in the form of a sheet onto a base. Specifically, coating such as air doctor coating, bar coating, blade coating, knife coating, reverse coating, transfer roll coating, gravure roll coating, kiss coating, cast coating, spray coating, slot orifice coating, calendar coating, dam coating, dip coating, and die coating; printing such as intaglio printing, e.g., gravure printing, and stencil printing, e.g., screen printing can be used, for example. When the composition has a low viscosity, a certain height of weir can be provided at the periphery of the base, and the composition can be cast in the space enclosed by the weir.

(Stacking of Mask)

In order to form the pillar regions 113, 123 as features of the anisotropic light diffusion layers 110, 120 according to the present embodiment in an efficient manner, it is also possible to stack a mask that locally changes the irradiation intensity of light in close to the light irradiation sides of the photo-curable composition layers. The material of the mask is preferably a light-absorbing filler such as carbon dispersed in a polymer matrix, which is configured such that incident light is partially absorbed by the carbon, whereas light can adequately pass through openings. In addition, it is effective, just to stack a normal transparent film on the photo-curable composition layer for preventing oxygen hindrance and promoting the formation of the pillar regions 113, 123. The light irradiation through such a mask or a transparent film develops a photopolymerization reaction in response to the irradiation intensity in the composition including the photo-polymerizable compound, thus easily showing a refractive-index distribution, which is effective for the preparation of the anisotropic light diffusion layers 110, 120 according to the present embodiment.

(Light Source)

As a light source for applying light irradiation to the composition including the photo-polymerizable compound (photo-curable resin layer), a short-circuit arc light source for ultraviolet generation is typically used, and specifically, it is possible to use a high-pressure mercury lamp, a low-pressure mercury lamp, a metal halide lamp, a xenon lamp, or the like. In addition, there is a need to irradiate the photo-curable resin layer with light rays parallel to the desired axis of scattering center Q, and the anisotropic light diffusion layers 110, 120 can be prepared by disposing a point light source and disposing an optical lens such as a Fresnel lens for parallel ray irradiation between the light source and the photo-curable resin layers in order to obtain such parallel ray, and irradiating the photo-curable resin, layers with parallel ray. On the other hand, in the case of using a linear light source, as described in JP 2005-292219 A, the anisotropic light diffusion layers 110, 120 can be prepared by interposing an assembly of tubular articles between the linear light source and the composition including the sheet-like photo-polymerizable compound, and applying light irradiation through the tubular articles. The use of a linear light source is preferred because continuous production can be achieved. A chemical lamp (a fluorescent lamp that emits ultraviolet light) can be used as the linear light source. Chemical lamps with a diameter of 20 to 50 mm and an irradiation length of 100 to 1500 mm are commercially available, and can be appropriately selected in accordance with the sizes the anisotropic light diffusion layers 110, 120 created.

The light rays for irradiating the composition including the photo-polymerizable compound need to include a wavelength that is able to cure the photo-polymerization compound, and light of wavelength centered, at 365 nm from a mercury lamp is typically used. In the case of preparing the anisotropic light diffusion layers 110, 120 with the use of the wavelength range, the illuminance preferably falls within the range of 0.01 to 100 mW/cm$^2$, more preferably within the range of 0.1 to 20 mW/cm$^2$. This is because the illuminance less than 0.01 mW/cm$^2$ requires a long period of time for curing, thus degrading the production efficiency, whereas in excess of 100 mW/cm$^2$, excessively rapid curing of the photo-polymerizable compound results in no structure formation, thereby making it impossible to provide intended anisotropic diffusion characteristics. It is to be noted, that the light irradiation time is not particularly limited, but 10 to 180 seconds, more preferably 30 to 120 seconds.

The anisotropic light diffusion layers 110, 120 according to the present embodiment are obtained from the formation of specific internal structures in the photocurable composition layers by low-illuminance light irradiation for a relatively long period of time as described above. Therefore, just by the light irradiation, the unreacted monomer component may remain, and produce stickiness, thereby leading to problems with handling ability and durability. In such a case, the polymerization of the remaining monomers can be achieved by additional light irradiation at a high illuminance of 1000 mW/cm$^2$ or more. The light irradiation in this case is preferably carried out from the side opposite to the side with the mask stacked.

The anisotropic optical film 100 according to the present embodiment can be obtained by stacking the anisotropic light diffusion layers 110, 120 prepared in the way described above in a direct manner or with the pressure-sensitive adhesive layer 130 interposed therebetween.

The pressure-sensitive adhesive for use in the pressure-sensitive adhesive layer 130 is not particularly limited as long as the pressure-sensitive adhesive has transparency, but a pressure-sensitive adhesive that has pressure-sensitive adhesiveness at ordinary temperature is used in a preferred manner. Examples of such a pressure-sensitive adhesive can include, for example, resins such as polyester resins, epoxy resins, polyurethane resins, silicone resins, and acrylic resins. In particular, acrylic resins are preferred in terms of high optical transparency and relative inexpensiveness. In the case of stacking a number of light diffusion layers (the light diffusion layers 110, 120 in the present embodiment) with a pressure-sensitive adhesive layer interposed therebetween, the pressure-sensitive adhesive layer preferably has a thickness around of 5 to 50 μm.

On the other hand, in the case of stacking the anisotropic light diffusion layer 120 directly on the anisotropic light diffusion layer 110, after curing a photo-curable resin layer for the anisotropic light diffusion layer 110, the composition including the photo-polymerizable compound may be applied or provided in the form of a sheet directly onto the cured anisotropic light diffusion layer 110. Furthermore, the anisotropic light-diffusion layer 120 is prepared in the same manner as the anisotropic light diffusion layer 110, thereby making it possible to obtain the anisotropic optical film 100.

<<Intended Use of Anisotropic Optical Film According to Present Embodiment>>

The configuration of and manufacturing method for the anisotropic optical film 100 according to the present embodiment have been described above in detail, and preferred intended uses of the anisotropic optical film 100 will be subsequently described with reference to FIGS. 12 and 13. FIGS. 12 and 13 are pattern diagrams illustrating examples of the configuration of a liquid crystal display panel that uses the anisotropic optical film 100 according to the present embodiment.

The anisotropic optical film 100 according to the present embodiment can be used in a preferred manner as a diffusion film for a display device. Any display device where display performance has a viewing-angle dependence may be adopted as a display device that makes the anisotropic optical film 100 available in a preferred manner. Such display devices can include, for example, liquid crystal display panels, PDP panels, organic EL panels, field emission displays, and rear projectors. In this regard, the fact that the display performance has a viewing-angle dependence means differences in display performance such as contrast, gradation property, and chromaticity, and significant changes in brightness between in the case of observation from a front direction (the normal direction at the observed surface of the display device, the direction of the viewing angle 0°) and in the case of observation from an oblique direction (the direction of an angle larger than the viewing angle 0°). In particular, in a TN mode or an STN mode of liquid crystal display panels, such a viewing-angle dependence is intensively developed, and the anisotropic optical film 100 according to the present embodiment is provided on the observed surface sides of the display devices, thereby, while keeping excellent display characteristics (e.g., brightness and contrast) in the direction of the viewing angle, making it possible to suppress decreased display characteristics in the other directions.

In addition, for example, in the case of using the anisotropic optical film 100 according to the present embodiment for a liquid crystal display device (LCD), the anisotropic optical film 100 may be disposed on the emitted light side of the liquid crystal display panel.

Specifically, as shown in FIGS. 12 and 13, for a liquid crystal display panel where a nematic liquid crystal 1013 is sandwiched between a pair of transparent glass substrates 1011, 1012 with transparent electrodes formed, and a pair of polarization plates 1014, 1015 is provided on both sides of the glass substrates 1011, 1012, the anisotropic optical film 100 can be disposed on the polarization plate 1014 or between the glass substrate 1011 and the polarization plate 1014. It is to be noted that known transparent glass substrates, nematic liquid crystals, and polarization plates can be typically used respectively as the transparent glass substrates, nematic liquid crystal, polarization plate, and the like mentioned above.

EXAMPLES

Next, the present invention will be further specifically described with examples and comparative examples, but the present invention is not limited by the examples in any way.

In accordance with the following methods, anisotropic optical films according to the present invention and anisotropic optical films according to comparative examples were produced.

Example 1

On the entire peripheral edge of a PET film (from Toyobo Co., Ltd., Trade Name: A4300) of 100 μm in thickness, a partition of 0.07 mm in height was formed from a curable resin with the use of a dispenser. This space within the partition was filled with the following photo-curable resin composition, and covered with another PET film.

silicone urethane acrylate (Refractive Index: 1.460, Weight Average Molecular Weight: 5,890) 20 parts by weight (from RAHN, Trade Name: 00-225/TM18)

Neopentyl Glycol Diacrylate (Refractive Index: 1.450) 30 parts by weight (from Daicel Cytec, Inc., Trade Name: Ebecryl 145)

EO Adduct Diacrylate of Bisphenol A (Refractive Index: 1.536) 15 parts by weight (from Daicel Cytec, Inc., Trade Name: Ebecryl 150)

Phenoxyethylacrylate (Refractive Index: 1.518) 40 parts by weight (from Kyoeisha Chemical Co., Ltd., Trade Name: Light Acrylate PO-A)

2,2-dimethoxy-1,2-diphenylethane-1-on 4 parts by weight (from BASF, Trade Name: Irgacure 651)

The liquid film of 0.07 mm in thickness, with both sides sandwiched between the PET films, was heated, and irradiated from above with parallel UV light rays emitted from an epi-illumination unit of a UV spot light source (from Hamamatsu Photonics K.K., Trade Name: L2859-01) perpendicularly from the normal direction at the coated film surface for 1 minute at an irradiation intensity of 5 mW/cm$^2$, thereby forming an anisotropic light diffusion layer with a large number of pillar structure on the PET film.

Furthermore, an anisotropic light diffusion layer with a large number of pillar structures was formed on a PET film with the use of a partition of 0.03 mm by changing the height of the partition.

Table 1 shows the result of measuring the linear transmittance of each anisotropic light diffusion layer alone with the PET film peeled. Furthermore, Table 2 shows the result of measuring the linear transmittance of an anisotropic optical film obtained by stacking two anisotropic light diffusion layers with a transparent pressure-sensitive adhesive material of 25 μm in thickness interposed therebetween.

Example 2

Two anisotropic light diffusion layers were obtained in the same way as in Example 1, except that the irradiation angle of the parallel UV light rays was changed to approximately 20° for the first anisotropic light diffusion layer and approximately 5° for the second anisotropic light diffusion layer. Tables 1 and 2 show optical characteristics for each layer and optical characteristic for an anisotropic optical film created with a pressure-sensitive adhesive interposed between the layers.

Example 3

Two anisotropic light diffusion layers were obtained in the same way as in Example 1, except that the irradiation angle of the parallel UV light rays was changed to approximately 40° for the first anisotropic light diffusion layer and approximately 20° for the second anisotropic light diffusion layer. Tables 1 and 2 show optical characteristics for each layer and optical characteristic for an anisotropic optical film created with a pressure-sensitive adhesive interposed between the layers.

Example 4

A stacked body of the same anisotropic light diffusion layers as those in Example 3 was created without any pressure-sensitive adhesive material interposed. After obtaining the first anisotropic light diffusion layer, the PET film as a cover was peeled, a partition of 0.03 mm was then additionally formed further on the partition formed on the first layer, and the space on the first anisotropic light diffusion layer was filled with a similar photo-curable resin composition, and covered with a PET film. Thereafter, the second anisotropic light diffusion layer was formed through similar operation, thereby providing an anisotropic optical film of the first and second layers attached closely. While optical characteristics for each anisotropic light diffusion layer were not measured, optical characteristics for each of the anisotropic light diffusion layer created under the same condition as in Example 3 are presumed to be equal to those in Example 3. Tables 1 and 2 show optical characteristics for the anisotropic optical film obtained.

Example 5

Two anisotropic light diffusion layers were obtained in the same way as in Example 1, except that the irradiation angle of the parallel UV light rays was changed to approximately 20° for the first anisotropic light diffusion layer and approximately 10° for the second anisotropic light diffusion layer, and the height of the partition on the second layer was adjusted to 0.02 mm. Tables 1 and 2 show optical characteristics for each layer and optical characteristic for an anisotropic optical film created with a pressure-sensitive adhesive interposed between the layers.

Example 6

Two anisotropic light diffusion layers were obtained in the same way as in Example 1, except that the irradiation angle of the parallel UV light rays beams was changed to approximately 20° for the first anisotropic light diffusion layer and approximately 15° for the second anisotropic light diffusion layer, and the height of the partition on the first layer was adjusted to 0.10 mm and the height of the partition on the second layer was adjusted to 0.03 mm. Tables 1 and 2 show optical characteristics for each layer and optical characteristic for an anisotropic optical film created with a pressure-sensitive adhesive interposed between the layers.

Example 7

Two andsotropic light diffusion layers were obtained in the same way as in Example 1, except that the irradiation angle of the parallel UV light rays was changed to approximately 20° for the first anisotropic light diffusion layer and approximately 15° for the second anisotropic light diffusion layer. Tables 1 and 2 show optical characteristics for each layer and optical characteristic for an anisotropic optical film created with a pressure-sensitive adhesive interposed between the layers.

Example 8

Two anisotropic light diffusion layers were obtained in the same way as in Example 1, except that the irradiation angle of the parallel UV light rays was changed to approximately 15° for the first anisotropic light diffusion layer and approximately 20° for the second anisotropic light diffusion layer, and, the height of the partition on the first layer was adjusted to 0.03 mm, whereas the height of the partition on the second layer was adjusted to 0.07 mm. Tables 1 and 2 show optical characteristics for each layer and optical characteristic for an anisotropic optical film created with a pressure-sensitive adhesive interposed between the layers.

Example 9

Two anisotropic light diffusion layers were obtained in the same way as in Example 1, except that the irradiation angle of the parallel UV light rays was changed to approximately 0° for the first anisotropic light diffusion layer and approximately 10° for the second anisotropic light diffusion layer, and the height of the partition on the first layer was adjusted to 0.05 mm, whereas the height of the partition on the second layer was adjusted to 0.03 mm. Tables 1 and 2 show optical characteristics for each layer and optical characteristic for an anisotropic optical film created with a pressure-sensitive adhesive interposed between the layers.

Example 10

Two anisotropic light diffusion layers were obtained in the same way as in Example 1, except that the irradiation angle of the parallel UV light rays was changed to approximately 30° for the first anisotropic light diffusion layer and approximately 40° for the second anisotropic light diffusion layer, and, the height of the partition on the first layer was adjusted to 0.07 mm, whereas the height of the partition on the second layer was adjusted to 0.03 mm. Tables 1 and 2 show optical characteristics for each layer and optical characteristic for an anisotropic optical film created with a pressure-sensitive adhesive interposed between the layers.

Comparative Example 1

An anisotropic light diffusion layer was obtained in the same way, except that the partition in Example 1 was changed to 0.1 mm. Only one anisotropic light diffusion layer was created without obtaining any anisotropic optical film of anisotropic light diffusion layers stacked. Tables 1 and 2 show optical characteristics for the obtained anisotropic light diffusion layer.

Comparative Example 2

In the same way as in Example 1, except that the heights of partitions were each made 0.07 mm in order to form two anisotropic light diffusion layers with the same thickness, the respective anisotropic light diffusion layers were obtained, and optical characteristic thereof were measured, and Table 1 shows the result of the measurement. Table 2 shows optical characteristics for an anisotropic optical film obtained by stacking two anisotropic light diffusion layers with a pressure-sensitive adhesive material interposed therebetween in the same way as in Example 1.

Comparative Example 3

In the same way as in Example 1, except that the heights of partitions were each made 0.03 mm in order to form two anisotromic light diffusion layers with the same thickness, the respective anisotropic light diffusion layers were obtained, and optical characteristic thereof were measured, and Table 1 shows the result of the measurement. Table 2 shows optical characteristics for an anisotropic optical film obtained by stacking two anisotropic light diffusion layers with a pressure-sensitive adhesive materiel interposed therebetween in the same way as in Example 1.

Comparative Example 4

In the same way as in Example 2, except that the heights of partitions were each made 0.07 mm in order to form two anisotropic light diffusion layers with the same thickness, the respective anisotropic light diffusion layers were obtained, and optical characteristic thereof were measured, and Table 1 shows the result of the measurement. Table 2 shows optical characteristics for an anisotropic optical film obtained by stacking two anisotropic light diffusion layers with a pressure-sensitive adhesive material interposed therebetween in the same way as in Example 2.

Comparative Example 5

In the same way as in Example 2, except that the heights of partitions were each made 0.03 mm in order to form two anisotropic light diffusion layers with the same thickness, the respective anisotropic light diffusion layers were obtained, and optical characteristic thereof were measured, and Table 1 shows the result of the measurement. Table 2 shows optical characteristics for an anisotropic optical film obtained by stacking two anisotropic light diffusion layers with a pressure-sensitive adhesive material interposed therebetween in the same way as in Example 2.

TABLE 1

| | 1st Layer | | | 2nd Layer | | |
|---|---|---|---|---|---|---|
| Example | Scattering Axis (°) | Maximum of Transmittance (%) | Minimum of Transmittance (%) | Scattering Axis (°) | Maximum of Transmittance (%) | Minimum of Transmittance (%) |
| Example 1 | 0 | 23 | 2 | 0 | 45 | 14 |
| Example 2 | 22 | 33 | 3 | 6 | 47 | 12 |
| Example 3 | 45 | 37 | 2 | 21 | 63 | 12 |

TABLE 1-continued

| | 1st Layer | | | 2nd Layer | | |
|---|---|---|---|---|---|---|
| Example | Scattering Axis (°) | Maximum of Transmittance (%) | Minimum of Transmittance (%) | Scattering Axis (°) | Maximum of Transmittance (%) | Minimum of Transmittance (%) |
| Example 4 | Not Measured (presumed to be equivalent to Example 3) | | | | | |
| Example 5 | 22 | 33 | 3 | 12 | 81 | 19 |
| Example 6 | 24 | 24 | 2 | 16 | 57 | 13 |
| Example 7 | 22 | 33 | 3 | 16 | 57 | 13 |
| Example 8 | 16 | 57 | 13 | 22 | 33 | 3 |
| Example 9 | 0 | 38 | 2 | 12 | 54 | 13 |
| Example 10 | 34 | 42 | 4 | 45 | 66 | 12 |
| Comparative Example 1 | 0 | 13 | 2 | — | — | — |
| Comparative Example 2 | 0 | 22 | 2 | 0 | 23 | 2 |
| Comparative Example 3 | 0 | 45 | 14 | 0 | 45 | 14 |
| Comparative Example 4 | 22 | 37 | 3 | 4 | 24 | 2 |
| Comparative Example 5 | 23 | 64 | 12 | 6 | 47 | 12 |

TABLE 2

| | Stacked Body | | | | |
|---|---|---|---|---|---|
| Example | Scattering Axis (°) | Maximum of Transmittance (%) | Minimum of Transmittance (%) | Diffusion Width (°) | Evaluation |
| Example 1 | 0 | 16 | 1 | 42 | Δ |
| Example 2 | 17 | 27 | 2 | 51 | ○ |
| Example 3 | 31 | 32 | 2 | 58 | ○○ |
| Example 4 | 33 | 28 | 2 | 52 | ○ |
| Example 5 | 20 | 33 | 3 | 48 | ○ |
| Example 6 | 21 | 26 | 2 | 52 | ○ |
| Example 7 | 20 | 36 | 2 | 58 | ◎ |
| Example 8 | 20 | 35 | 2 | 55 | ◎ |
| Example 9 | 10 | 25 | 2 | 49 | ○ |
| Example 10 | 42 | 37 | 2 | 56 | ◎ |
| Comparative Example 1 | 0 | 13 | 2 | 24 | X |
| Comparative Example 2 | 0 | 8 | 1 | 32 | X |
| Comparative Example 3 | 0 | 20 | 2 | 29 | X |
| Comparative Example 4 | 17 | 16 | 1 | 35 | X |
| Comparative Example 5 | 18 | 30 | 2 | 33 | X |

It is to be noted that the evaluation criteria in Table 2 are as follows.

◎ maximum value of transmittance: 35% or more and diffusion width: 55° or more

○○ maximum value of transmittance: 25% or more and less than 35% and diffusion width: 55° or more ○ maximum value of transmittance: 25% or more and less than 35% and diffusion width: 40° or more and less than 55°

Δ maximum value of transmittance: 10% or more and less than 25% and diffusion width: 40° or more and less than 55°

× maximum value of transmittance: 10% or more and less than 25% and diffusion width: less than 40°

As shown, in Table 2, the anisotropic optical films according to the examples have maximum values of relatively high transmittance, and at the same time, large diffusion widths. In particular, Examples 7, 8, and 10 all have achieved a balance between the high transmittance and the large diffusion width at a high level, which can be considered as excellent anisotropic optical films. On the other hand, the anisotropic light diffusion layer or anisotropic optical films according to the comparative examples are comparable in transmittance to the examples, but small in diffusion width. In addition, Examples 3, 4, and 10 have directions of scattering axis around 30 to 40°, and large diffusion widths, thus in favor of improving the viewing angles in the directions, and the visual confirmation with the films attached to surfaces of actual transmissive LCDs found display bodies with brightness and contrast favorable and viewing angles wide, and with less uncomfortable feeling such as color changes.

Accordingly, the anisotropic optical films according to the examples can achieve a balance between a high transmittance and a diffusion width, and achieve effects such as making the contrast and brightness in the front direction less likely to be decreased while achieving excellent characteristics with respect to the viewing angle, when the film is used as a diffusion film of a display body.

While the preferred embodiment of the present invention has been described with reference to the drawings, the present invention is not limited to the embodiment described above. More specifically, it is understood that other embodiments or various types of modification examples that could have been conceived of by one skilled in the art within the scope of the invention as specified in the claims also fall within the technical scope of the present invention.

For example, while the anisotropic optical film including two anisotropic light diffusion layers has been described in the embodiment described above, the anisotropic optical film according to the present invention may have three or more anisotropic light diffusion layers.

In the application, two types of structures are disclosed for the anisotropic optical film. One type is a combination of pillar & matrix regions. Such pillar regions are illustrated, for example, in FIGS. 1, 4, 5, 10A and 10B, being denoted with 13, 23, 113 and 123. The matrix regions are illustrated, fore example, in the same drawings, being denoted with 11, 21, 111 and 121. The other type of structures is a combination of plate-like & matrix regions. Such a combination is illustrated, for example, in FIG. 2, being denoted with 53 for the plate-like region and 51 for the matrix region. Since both of the pillar region and the plate-like region have similar functions with respect to the matrix regions, these regions are termed as a columnar region for the invention.

REFERENCE SIGNS LIST 100 anisotropic optical film
110 anisotropic light diffusion layer (a)
111 matrix region
113 pillar region
120 anisotropic light diffusion layer (b)
121 matrix region
123 pillar region
130 pressure-sensitive adhesive layer
P orientation direction of pillar regions

The invention claimed is:

1. An anisotropic optical film comprising two or more anisotropic light diffusion layers where a linear transmittance varies depending on an incident angle of incident light, wherein
   each of the anisotropic light diffusion layers has a matrix region and a plurality of columnar regions that differ in refractive index from the matrix region,
   the film comprises, as the anisotropic light diffusion layers, at least two types of anisotropic light diffusion layers (a) and (b) that differ in linear transmittance,
   the anisotropic light diffusion layer (a) has a maximum linear transmittance of 40% or more and less than 95% as a linear transmittance of incident light at an incident angle that maximizes the linear transmittance, and has a minimum linear transmittance of less than 20% as a linear transmittance of incident light at an incident angle that minimizes the linear transmittance,
   the maximum linear transmittance of the anisotropic light diffusion layer (b) is 30% or more and less than 40%, and the minimum linear transmittance thereof is 5% or less, and
   the anisotropic optical film has a flat incident surface where a normal line is defined with respect to the incident surface, the normal line being perpendicular to the incident surface,
   the columnar regions of the anisotropic light diffusion layer (a) are oriented at a first polar angle ($\theta 1$) with respect to the normal line, the first polar angle being ranged from $-90°$ to $+90°$,
   the columnar regions of the anisotropic light diffusion layer (b) are oriented at a second polar angle ($\theta 2$) with respect to the normal line, the second polar angle being ranged from $-90°$ to $+90°$, and
   an absolute value of a difference between the first and second polar angles is $0°$ or more and $30°$ or less.

2. The anisotropic optical film according to claim 1, wherein
   a first orientation direction in which the columnar regions of the anisotropic light diffusion layer (a) are oriented is defined,
   a second orientation direction in which the columnar regions of the anisotropic light diffusion layer (b) are oriented is defined,
   seen from the first orientation direction, each of the columnar regions of the anisotropic light diffusion layer (a) has a first diameter and a second diameter,
   an aspect ratio that is obtained by dividing the second diameter with the first diameter is 1 or more and less than 2,
   seen from the second orientation direction, each of the columnar regions of the anisotropic light diffusion layer (b) has a third diameter and a fourth diameter, and another aspect ratio that is obtained by dividing the fourth diameter with the third diameter is 1 or more and less than 2.

3. The anisotropic optical film according to claim 1, wherein
   the anisotropic light diffusion layers are each 15 µm or more and 100 µm or less in thickness.

4. The anisotropic optical film according to claim 1, wherein
   the anisotropic optical film further comprises a transparent pressure-sensitive adhesive layer between the plurality of anisotropic light diffusion layers.

5. The anisotropic optical film according to claim 1, wherein
   the columnar regions of the anisotropic light diffusion layer (a) incline with respect to the normal line,
   seen from a direction of the first polar angle, each of the columnar regions has a first diameter and a second diameter, and an aspect ratio that is obtained by dividing the second diameter with the first diameter is 1 or more and less than 2.

6. The anisotropic optical film according to claim 1, wherein
   the anisotropic light diffusion layers are each 15 µm or more and 100 µm or less in thickness.

7. The anisotropic optical film according to claim 2, wherein
   the anisotropic light diffusion layers are each 15 µm or more and 100 µm or less in thickness.

8. The anisotropic optical film according to claim 5, wherein
   the anisotropic light diffusion layers are each 15 µm or more and 100 µm or less in thickness.

9. The anisotropic optical film according to claim 1, wherein
   the anisotropic optical film further comprises a transparent pressure-sensitive adhesive layer between the plurality of anisotropic light diffusion layers.

10. The anisotropic optical film according to claim 2, wherein
    the anisotropic optical film further comprises a transparent pressure-sensitive adhesive layer between the plurality of anisotropic light diffusion layers.

11. The anisotropic optical film according to claim 1, wherein
    the columnar regions of the anisotropic light diffusion layer (b) incline with respect to the normal line,
    seen from a direction of the second polar angle, each of the columnar regions has a third diameter and a fourth diameter, and an aspect ratio that is obtained by dividing the fourth diameter with the third diameter is 1 or more and less than 2.

12. The anisotropic optical film according to claim 1, wherein
    the columnar regions of the anisotropic light diffusion layer (a) and the columnar regions of the anisotropic light diffusion layer (b) both incline with respect to the normal line,
    seen from a direction of either the first polar angle or the second polar angle, each of the columnar regions of the anisotropic light diffusion layer (a) and the anisotropic light diffusion layer (b) respectively has a first diameter, a third diameter and a second diameter, a fourth diameter and an aspect ratio that is obtained by dividing the second diameter with the first diameter is 1 or more and less than 2, and another aspect ratio that is obtained by dividing the fourth diameter with the third diameter is 1 or more and less than 2.

13. The anisotropic optical film according to claim 1, wherein the columnar regions of the anisotropic light diffusion layer (a) and the columnar regions of the anisotropic light diffusion layer (b) are both oriented in the normal line, seen from the normal line, each of the columnar regions of the anisotropic light diffusion layer (a) and the anisotropic light diffusion layer (b) respectively has a first diameter, a third diameter and a second diameter, a fourth diameter and an aspect ratio that is obtained by dividing the second diameter with the first diameter is 1 or more and less than 2, and another aspect ratio that is obtained by dividing the fourth diameter with the third diameter is 1 or more and less than 2.

14. The anisotropic optical film according to claim 1, wherein the columnar regions of the anisotropic light diffusion layer (a), which are disposed within a predetermined section of the anisotropic optical film, are counted.

15. The anisotropic optical film according to claim 1, wherein the columnar regions of the anisotropic light diffusion layer (a), which are disposed over the anisotropic optical film, are counted.

16. The anisotropic optical film according to claim 1, wherein all of the columnar regions of the anisotropic light diffusion layer (a) incline at the first polar angle.

17. The anisotropic optical film according to claim 1, wherein all of the columnar regions of the anisotropic light diffusion layer (b) incline at the second polar angle.

18. The anisotropic optical film according to claim 1, wherein the first polar angle of the anisotropic light diffusion layer (a) is ranged from 10° to 60°.

19. The anisotropic optical film according to claim 1, wherein the second polar angle of the anisotropic light diffusion layer (b) is ranged from 10° to 60°.

20. The anisotropic optical film according to claim 1, wherein the first polar angle of the anisotropic light diffusion layer (a) and the second polar angle of the anisotropic light diffusion layer (b) are both ranged from 10° to 60°.

21. The anisotropic optical film according to claim 1, wherein the absolute value of the difference between the first and second polar angles is 6° or more and 30° or less.

* * * * *